US012448417B2

(12) United States Patent
Van Roosmalen et al.

(10) Patent No.: US 12,448,417 B2
(45) Date of Patent: Oct. 21, 2025

(54) CRYPTOSPORIDIOSIS VACCINE

(71) Applicant: Intervet Inc., Madison, NJ (US)

(72) Inventors: Markus Hendrikus Van Roosmalen, Berkel-Enschot (NL); Koen Gevers, Boxmeer (NL)

(73) Assignee: Intervet Inc., Rahway, NJ (US)

( * ) Notice: Subject to any disclaimer, the term of this patent is extended or adjusted under 35 U.S.C. 154(b) by 546 days.

(21) Appl. No.: 17/784,690

(22) PCT Filed: Dec. 17, 2020

(86) PCT No.: PCT/EP2020/086646
§ 371 (c)(1),
(2) Date: Jun. 13, 2022

(87) PCT Pub. No.: WO2021/122896
PCT Pub. Date: Jun. 24, 2021

(65) Prior Publication Data
US 2023/0015910 A1     Jan. 19, 2023

(30) Foreign Application Priority Data

Dec. 18, 2019 (EP) .................... 19217573
Apr. 29, 2020 (EP) .................... 20172007

(51) Int. Cl.
| | |
|---|---|
| C07K 14/44 | (2006.01) |
| A61K 35/20 | (2006.01) |
| A61K 39/00 | (2006.01) |
| A61K 39/002 | (2006.01) |
| A61K 39/39 | (2006.01) |
| A61P 1/12 | (2006.01) |
| A61P 33/02 | (2006.01) |
| C07K 16/20 | (2006.01) |
| C12P 21/02 | (2006.01) |

(52) U.S. Cl.
CPC .............. *C07K 14/44* (2013.01); *A61K 35/20* (2013.01); *A61K 39/002* (2013.01); *A61K 39/39* (2013.01); *A61P 1/12* (2018.01); *A61P 33/02* (2018.01); *C07K 16/20* (2013.01); *C12P 21/02* (2013.01); *A61K 2039/552* (2013.01); *A61K 2039/55511* (2013.01)

(58) Field of Classification Search
CPC ..................................................... C07K 14/44
See application file for complete search history.

(56) References Cited

U.S. PATENT DOCUMENTS

2002/0081312 A1   6/2002   Priest et al.
2005/0106163 A1   5/2005   David et al.

FOREIGN PATENT DOCUMENTS

| WO | 1993024649 A1 | 12/1993 |
|---|---|---|
| WO | 9845415 A1 | 10/1998 |
| WO | 98/51660 A1 | 11/1998 |
| WO | 2001040248 A1 | 6/2001 |
| WO | 2001040439 A2 | 6/2001 |
| WO | 2001045735 A2 | 6/2001 |
| WO | 2001077293 A2 | 10/2001 |
| WO | 2006112694 A2 | 10/2006 |
| WO | 2011056175 A1 | 5/2011 |
| WO | WO 2013059442 A2 | 4/2013 |
| WO | WO 2013059442 A3 | 4/2013 |
| WO | 2016141338 A2 | 9/2016 |
| WO | 2016187027 A1 | 11/2016 |

OTHER PUBLICATIONS

Cevallos et al., Infection and Immunity, 2000; 68(7): 4108-4116 (Year: 2000).*
Perryman, Lance E. et al., Protection of calves against cryptosporidiosis with immune bovine colostrum induced by a Cryptosporidium parvum recombinant protein, Vaccine, 17, 2142-2149, 1999.
Rueda, Paloma et al., Effect of different baculovirus inactivation procedures on the integrity and immunogenicity of porcine parvovirus-like particles, Vaccine, 19, 726-734, 2001.
O'Connor et al., 2007, "Cryptosporidium parvum glycoprotein gp40 localizes to the sporozoite surface by association with gp15," Mol. Biochem. Parasitol., 156(1):80-83.
Pakula et al., 1989, "Genetic analysis of protein stability and function," Annu. Rev. Genet., 23:289-310.
Starikova et al., 2017, "Cryptosporidia and Macroorganism: Factors that Influence on the Development of Cryptosporidiosis," Ann. of the Russian Acad. of Med. Sci., 72(6):420-427, in Russian with English abstract.
Bahnemann, H.G., Inactivation of viral antigens for vaccine preparation with particular reference to the application of binary ethylenimine, Vaccine, 1990, pp. 299-303, vol. 8.

(Continued)

*Primary Examiner* — Brian Gangle
*Assistant Examiner* — Lakia J Jackson-Tongue
(74) *Attorney, Agent, or Firm* — Susanna. C. Benn

(57) ABSTRACT

The invention is based on the finding that incubating a Cryptosporidium gp40 protein with an aziridine, significantly increases its immunogenicity. When used as a vaccine, this allows a reduction of the dose, which improves economic feasibility and safety. Consequently the aziridine-treated gp40 can now be used as a safe and effective subunit-vaccine for humans or non-human-animals against Cryptosporidiosis. Specifically for new-born ruminants a vaccination by way of colostral transfer was found to be very effective in reducing clinical signs of Cryptosporidiosis, especially diarrhoea.

8 Claims, 3 Drawing Sheets

Figures 1, 2:
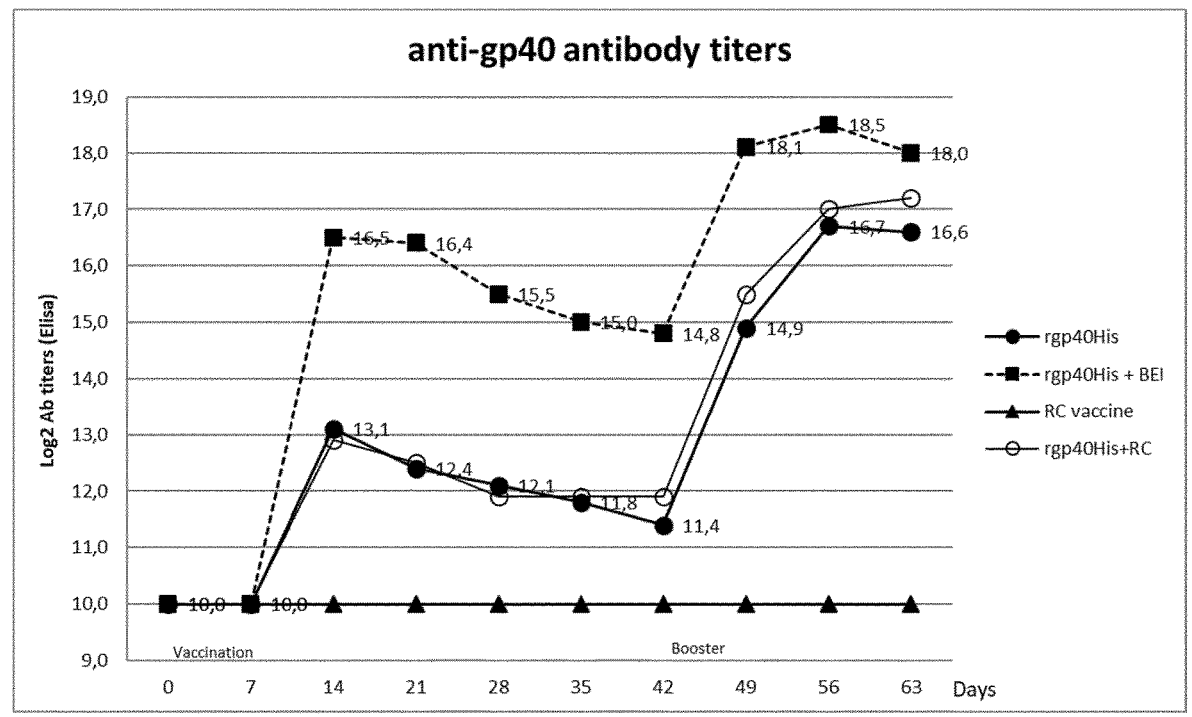
Figure 3:
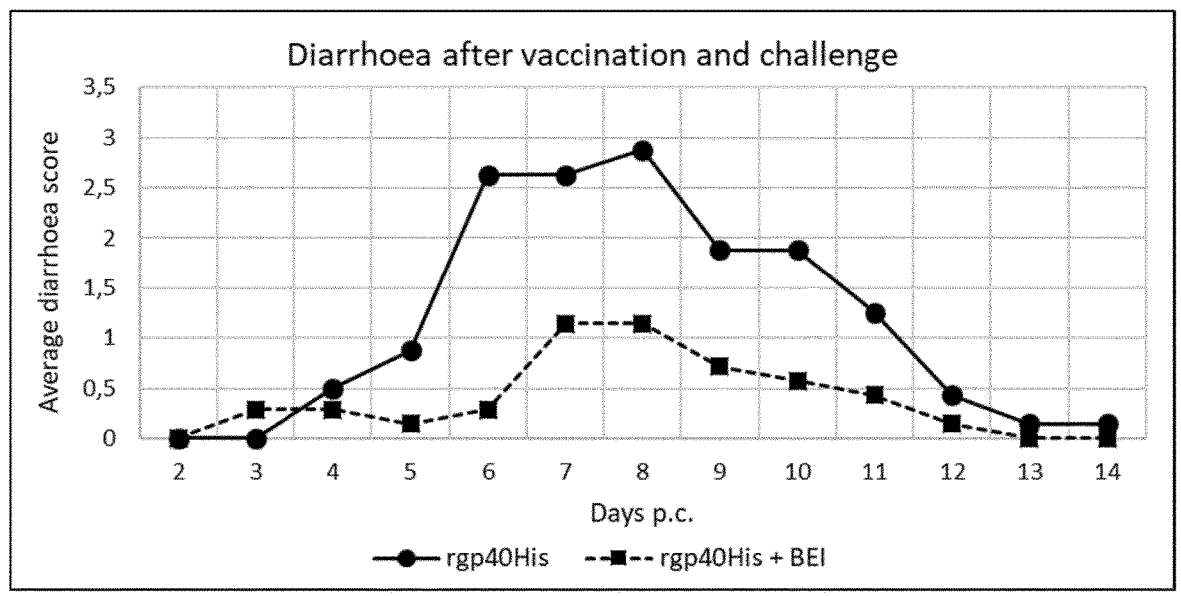

Specification includes a Sequence Listing.

(56) References Cited

OTHER PUBLICATIONS

Blackburn, N.K. and Besselaar, T.G., A study of the effect of chemical inactivants on the epitopes of Rift Valley fever virus glycoproteins using monoclonal antibodies, Journal of Virological Methods, 1991, pp. 367-374, 33.
Cevallos, A.M., Molecular Cloning and Expression of a Gene Encoding Cryptosporidium parvum Glycoproteins gp40 and gp15, Infection and Immunity, 2000, pp. 4108-4116, vol. 68, No. 7.
Chambers, Adam C. et al., Overview of the Baculovirus Expression System, Current Protocols in Protein Science, 2018, 5.4.1-5.4.6, Suppl. 91.
Chen, Weisan et al., Modification of Cysteine Residues In Vitro and In Vivo Affects the Immunogenicity and Antigenicity of Major Histocompatibility Complex Class I—restricted Viral Determinants, The Journal of Experimental Medicine, 1999, 1757-1764, 189(11).
Delrue, I. et al., Assessing the functionality of viral entry-associated domains of porcine reproductive and respiratory syndrome virus during inactivation procedures, a potential tool to optimize inactivated vaccines, Veterinary Research, 2009, 1-15, 40(6).
Delrue, Iris et al., Inactivated virus vaccines from chemistry to prophylaxis: merits, risks and challenges, Expert Review of Vaccines, 2012, 695-719, 11(6).
Elguero, Maria E. et al., The Cryptosporidium parvum gp60 glycoprotein expressed in the ciliate Tetrahymena thermophila is immunoreactive with sera of calves infected with Cryptosporidium oocysts, Veterinary Parasitology, 2019, 45-50, 271.
GenBank acc.nr. L34568 (2 pages).
GenBank acc.nr. U22892 (2 pages).
GenBank accession No. AAF78345.1 (1 page).
GenBank accession Nos. ACR78128.1 (1 page).
GenBank accession Nos. AOA32955.1 (1 page).
Grovit-Ferbas, K. et al., Enhanced Binding of Antibodies to Neutralization Epitopes following Thermal and Chemical Inactivation of Human Immunodeficiency Virus Type 1, Journal of Virology, 2000, pp. 5802-5809, vol. 74, No. 13.
Hulskotte, E.G.J. et al., Chemical inactivation of recombinant vaccinia viruses and the effects on immunogenicity of recombinant simian immunodeficiency virus envelope glycoproteins, Vaccine, 1997, pp. 1839-1845, vol. 15, No. 17/18.
Jenkins, Mark C. et al., Cloning and Expression of a cDNA Encoding Epitopes Shared by 15-and 60-Kilodalton Proteins of Cryptosporidium parvum Sporozoites, Infection and Immunity, 1993, 2377-2382, 61(6).
Leav, B.A. et al., Analysis of Sequence Diversity at the Highly Polymorphic Cpgp40/15 Locus among Cryposporidium Isolates from Human Immunodeficiency Virus-Infected Children in South Africa, Infection and Immunity, 2002, pp. 3881-3890, vol. 70, No. 7.
Lemieux, Maxime W. et al., Lessons Learned from Protective Immune Responses to Optimize Vaccines against Cryptosporidiosis, Pathogens, 2017, 1-20, 7(2).
O'connor, R.M et al., Stable expression of Cryptosporidium parvum glycoprotein gp40/15 in Toxoplasma gondii, Molecular & Biochemical Parasitology, 2007, pp. 149-158, 152.
Priest, J.W. et al., Cloning of the immunodominant 17-kDa antigen from Cryptosporidium parvum, Molecular and Biochemical Parasitology, 2000, pp. 261-271, 106.
Strong, W.B. et al., Cloning and Sequence Analysis of a Highly Polymorphic Cryptosporidium parvum Gene Encoding a 60-Kilodalton Glycoprotein and Characterization of Its 15-and 45-Kilodalton Zoite Surface Antigen Products, Infection and Immunity, 2000, pp. 4117-4134, vol. 68, No. 7.
Winter, G. et al., Characterization of a major sporozoite surface glycoprotein of Cryptosporidum parvum, Funct Integr Genomics, 2000, pp. 207-217, 1.
Wu, Zhiliang et al., Intraspecies Polymorphism of Cryptosporidium parvum Revealed by PCR-Restriction Fragment Length Polymorphism (RFLP) and RFLP-Single-Strand Conformational Polymorphism Analyses, Applied and Environmental Microbiology, 2003, 4720-4726, 69(8).

* cited by examiner

```
DVPVEGSSSS SSSSSSSSSS SSSTSTVAPA NKARTGEDAE GSQDSSGTEA    50
SGSQGSEEEG SEDDGQTSAA SQPTTPAQSE GATTETIEAT PKEECGTSFV   100
MWFGEGTPAA TLKCGAYTIV YAPIKDQTDP APRYISGEVT SVTFEKSDNT   150
VKIKVNGQDF STLSANSSSP TENGGSAGQA SSR                     183
```

CRYPTOSPORIDIOSIS VACCINE

CROSS-REFERENCE TO RELATED APPLICATIONS

This application is a National Stage application of International Patent Application No. PCT/EP2020/086646 filed Dec. 17, 2020, which claims priority to European Patent Application No. 20172007.5, filed Apr. 29, 2020 and European Patent Application No. 19217573.5, filed Dec. 18, 2019.

The present invention regards the field of parasitological vaccines. More specifically the invention regards a Cryptosporidium gp40 protein, methods for the preparation of said protein, medical uses of that protein as a vaccine against Cryptosporidiosis, a vaccine comprising the protein and the manufacture of that vaccine, and methods for the protection against Cryptosporidiosis.

Cryptosporidia are parasitic protozoa of the phylum Apicomplexa. In mammals they reside mainly in the intestines, and cause Cryptosporidiosis, which is mainly characterised by diarrhoea, with cramps, dehydration, secondary infections, etc. Symptoms can vary from mild in immunocompetent humans- or non-human animals, to severe in hosts that are more vulnerable, such as the young or immunocompromised. In human medicine, the disease is most prominent in malnourished children, and in AIDS patients. In veterinary medicine the disease in new-born ruminants: sheep, goats, but especially in calves, is a major concern, both for animal welfare- as for economic reasons. The main pathogen is *Cryptosporidium parvum* which occurs in a zoonotic and in an anthroponotic genotype. Many other species of Cryptosporidia, such as the human pathogen *C. hominis*, also cause Cryptosporidiosis.

The parasitic stage that is shed by infected hosts are the oocysts, which are highly infectious, and are resilient to environmental conditions and to many disinfectants. This way an infection can spread rapidly via faecal material, for example by close contact, or by faecal contamination of food or drinking water.

A few drugs have been approved for therapeutic treatment of Cryptosporidiosis: Nitazoxanide (a thiazolide) is indicated for use in immunocompetent humans, and Halocure® (a halofuginone, MSD Animal Health) can be used for new-born calves. Ideally an effective vaccine should also be developed, however this has proven very difficult as a result of the parasite's complex lifecycle, and also because no in vitro culturing of the parasite is possible. As a result, there currently are no registered vaccines against Cryptosporidiosis.

This is not for lack of trying, as a large variety of experimental vaccines against Cryptosporidiosis have been tested over time, including live attenuated-, killed-, lysate-, and subunit type vaccines. As subunit vaccine many proteins from different parasite stages have been tried. For a review see: Lemieux et al. (2018, Pathogens, vol. 7, DOI: 10.3390/pathogens7010002).

One of many candidate antigens for a subunit-vaccine is a mucin-type glycoprotein of 40 kDa from Cryptosporidia: gp40. This protein occurs on the surface of the motile parasite stages, and is heavily glycosylated.

It must be noted that protein naming for Cryptosporidia is confusing, and gp40 (or its encoding gene or gene-product) is also called Cpgp40/15 (Cevallos et al., 2000, Inf. & Imm., vol. 68, p. 4108-4116); gp15/45/60 (Strong et al., 2000, Inf. & Imm., vol. 68, p. 4117-4134); or S60 (Winter et al., 2000, Funct. Integr. Genomics, vol. 1, p. 207-217). Related is also the Cp17 protein (Priest et al., 2000, Mol. Biochem. Parasit., vol. 106, p. 261-271). The differences in indicated molecular weight reflect variability in sequence and glycosylation level. Of note is also that the antigen named 'Cp15/60' is a different protein (Jenkins et al., 1993, Inf. and Imm., vol. 61, p. 2377-2382; GenBank acc.nr. U22892). The same applies to the antigens named 'CP15' (GenBank acc.nr. L34568), or 'cp41' (WO 01/040439).

The expression of gp40 in a recombinant expression system and use for (passive) vaccination has been suggested since many years, e.g. in: WO 93/024649, WO 01/040248, WO 01/077293, and US 2002/0081312. However still no functional vaccine is available.

For new-born ruminants that are usually infected very early in life, active vaccination would only provide protection after 3 to 4 weeks which is too late in practice. However a convenient method of passive vaccination against Cryptosporidiosis is possible by colostral transfer, e.g. by feeding a calf colostrum from a vaccinated bovine. Such vaccination of new-born calves against neonatal diarrhoea, a.k.a. calf scours, by colostral transfer is e.g. described in WO 01/045735 and WO 2011/056175. Also this method of protection would be in line with the administration currently applied for other causes of new-born calf diarrhoea, such as by *Escherichia coli*, bovine coronavirus, bovine rotavirus, and Clostridia. Passive vaccination of humans by feeding of (antibodies from) colostrum was also effective, see Lemieux et al., 2018 (supra).

Many publications thus describe the isolation or expression of Cryptosporidium antigens and their study in diagnostics or antigenicity studies. Several of the antigens are also suggested to be used for active or passive vaccination of humans or animals. However no commercial vaccine has been approved to date. Consequently, there is a need in the field for a vaccine that is safe, and is effective against Cryptosporidiosis.

Aziridines are organo-chemical compounds comprising an aziridine ring. These compounds are used in human medicine as anti-cancer agents for their tendency to damage nucleic acids by an alkylation reaction, causing cross-linking and strand breaks. In biotechnology this property of aziridines is used for the inactivation of micro-organisms such as bacteria and viruses.

Next to nucleic acids, aziridines can react with proteins, by the alkylation of nucleophilic sites on amino acids. For example by reacting with a sulphur-containing side chain such as a sulfhydryl- or a thio-ether-group; with a nitrogen-containing side chain such as an amino group; or with an oxygen-containing side chain such as a hydroxy group.

These reactions can occur with one or more of the amino acids of a protein; which amino acid(s) react with the aziridine and become alkylated is not fully understood.

A much used aziridine for the inactivation of viruses is ethylenimine (EI), mostly used in the form of binary ethylenimine (BEI). This is reviewed by H. Bahnemann (1990, Vaccine, vol. 8, p. 299-303).

Although it is a dangerous chemical, use of EI is preferred over traditional virus inactivation with formalin, because of its more predictable, i.e. linear, reaction kinetics. Also, because EI preferably reacts with nucleic acids, it is less damaging to the immunogenicity of protein antigens than formalin (Blackburn & Besselaar, 1991, J. of Virol. Methods, vol. 33, p. 367-374; Hulskotte et al., 1997, Vaccine, vol. 15, p. 1839-1845).

There are a few reports wherein the incubation of a protein antigen with a chemical was described to increase antigenicity, however that was only for protein cross-linking reactions, such as by formalin and/or heat-treatment (Grovit-Ferbas et al., 2000, J. of Virol., vol. 74, p. 5802-5809). Other incubations of subunit proteins with an inactivating agent are only described for the detoxification of bacterial toxins with formalin. For aziridines no incubation with a subunit protein has been described, outside of the context of a use for inactivation of micro-organisms. No incubation with an aziridine has been described for a Cryptosporidium gp40 protein.

Several papers describe negative effects on immunogenicity from the effect of aziridines on proteins during inactivation reactions, and recommend precautions; Chen et al. (1999, J. of Exp. Med., vol. 189, p. 1757-1764) describe loss of antigenicity by the S-alkylation of cysteines in proteins. To reduce such reactivity, WO 98/51660 describes the development of polymers of El which are even more specific for nucleic acids. Also, WO 98/45415 describes inactivation with El at an acid pH level to reduce adverse reaction with viral proteins.

It is an object of the present invention to overcome a disadvantage in the prior art, and to accommodate to this need in the field by providing a vaccine against Cryptosporidiosis that is safe and effective.

When the inventors attempted to develop a Cryptosporidiosis vaccine based on recombinant expressed gp40 protein, initial results were promising: gp40 could be expressed in *E. coli* as described in the literature, and was used with standard adjuvants to vaccinate pregnant heifers. After calving colostrum was obtained containing high levels of gp40-specific antibodies. When calves were fed the colostrum, they were protected from disease resulting from a severe *C. parvum* challenge infection. Unfortunately the level of the recombinant expression was not high, and the expressed gp40 protein was of low immunogenicity so that relatively high antigen doses needed to be applied. Under these conditions, the production of a Cryptosporidiosis vaccine based on recombinant expressed gp40 was not deemed feasible for commercialisation.

A further problem was that gp40 protein appeared to be quite reactive upon vaccination: when administering immunologically effective doses of gp40 to bovines as a standard emulsified vaccine, general safety was good and there was no effect on pregnancy, but unacceptable levels of local vaccination reactions occurred, especially with a subcutaneous route of administration. Also these local reactions increased after a booster vaccination.

While the use of lower antigen doses reduced the local vaccination side-reactions to acceptable levels, unfortunately these doses did not induce sufficient antibody levels in the colostrum so that this could provide effective passive vaccination of calves.

The inventors had no clue how to overcome these problems in order to develop an affordable, safe and effective vaccine against Cryptosporidiosis.

Surprisingly it was found that an object of the invention can be met, and consequently one or more disadvantages of the prior art can be overcome, by incubating a gp40 protein with an aziridine before its use as a vaccine. This incubation was found to significantly increase the immunogenicity of the gp40, which resulted in a higher titre of gp40-specific antibodies in the vaccinated mammalian target, and subsequently also in colostrum obtained from that vaccinated target; this as compared to immunisation with the same amount of a gp40 that was not incubated with an aziridine.

This finding allows for a reduction of the antigenic mass of gp40 used for vaccination by 10-20-fold as compared to gp40 that was not incubated with an aziridine, while still inducing sufficient antibody levels in colostrum to provide effective passive immune-protection in off-spring against a severe Cryptosporidium challenge infection. Next to providing an effective vaccine against Cryptosporidiosis, the significant reduction of the gp40 antigenic mass per vaccine dose possible, solved two further problems: it reduces the level of local reactions so that vaccination with an effective dose is now safe. In addition it makes a Cryptosporidiosis vaccine based on recombinant expressed gp40 economically feasible.

It is known that gp40-specific antibodies can inhibit the invasion of Cryptosporidia parasites into host cells. Consequently, when the vaccination against Cryptosporidiosis is performed passively, e.g. by feeding colostrum from a vaccinated mammal, the increased level of antibodies in that colostrum will provide for an increased local level of antibodies in the gastro-intestinal tract, and provide protection against invasion of the parasites.

However it is not known exactly how or why aziridine incubation increases the immunogenicity of gp40.

Although the inventors do not want to be bound by any theory or model that might explain these findings, they expect that the chemical change to the gp40 protein induced by the incubation with the aziridine, specifically the alkylation of one or more amino acids, leads to a different response from the immune system of a vaccinated human- or non-human animal target, as compared to the immune response to gp40 that was not alkylated by an aziridine. Next to the observed increase in the level of anti-gp40 antibodies that is generated, there probably are also one or more other changes to the antibody profile generated, such as in the avidity and/or the specificity of the antibodies generated. In addition there can be a change in the type or level of the cellular immune response that is activated.

This was not at all obvious from any disclosure in the prior art: over the many publications reporting of damage to immunogenic epitopes during chemical inactivation, a positive effect on immunogenicity by aziridine incubation was totally unexpected. Let alone an increase of immunogenicity of this magnitude. In addition, when incubating gp40 with formalin, Triton X-100, or after gamma-ray irradiation, no similar effect was observed.

Therefore in one aspect the invention regards a Cryptosporidium gp40 protein or an immunogenic part thereof, characterised in that the gp40 protein and the part thereof comprise one or more alkylated amino acids.

A "protein" is a molecular chain of amino acids, as defined herein. Inter alia: polypeptide, peptide, and oligopeptide are included within the definition of protein. The protein can be of natural or of synthetic origin, can be a native or a mature protein, a pre- or pro-protein, or a part of a protein.

The term "Cryptosporidium" refers to a genus of parasites of the phylum Apicomplexa, and the subclass Coccidia. These micro-organisms have the characterising features of their taxonomic class, such as the morphologic, genomic, and biochemical characteristics, as well as the biological characteristics such as physiologic, immunologic, or pathologic behaviour. A large number of species of Cryptosporidium parasites are known. These can infect a wide variety of non-human animals as well as humans.

Well known species of Cryptosporidium parasite is *C. parvum*, which appears in two genotypes: genotype I which is considered to be infectious for humans only, and genotype II that is a proven zoonotic agent. Both genotypes of *C. parvum* cause Cryptosporidiosis, especially in vulnerable targets. A reference for the characteristics and the effects of

*C. parvum* in veterinary medicine is: "The Merck veterinary manual" (11th ed., 2016, ISBN-10: 9780911910612).

As is known in the field, the classification of a microorganism in a particular taxonomic group is based on a combination of its features. The invention therefore also includes other species of Cryptosporidium that are classified in this genus. Similarly, this refers to parasites that are sub-classified therefrom in any way, for instance as a subspecies, strain, isolate, genotype, variant, subtype or subgroup, and the like.

Further, it will be apparent to a person skilled in the field of the invention that while a particular parasite for the invention may currently be assigned to such species or genus, however that is a taxonomic classification that could change in time as new insights can lead to reclassification into a new or different taxonomic group. However, as this does not change the parasite itself, or its antigenic repertoire, but only it's scientific name or classification, such re-classified parasites remain within the scope of the invention.

Samples of Cryptosporidium parasites for use in the invention can be obtained from a variety of sources, e.g. as field isolate from a human, or from a non-human animal in the wild or on a farm, or from various laboratories, (depository) institutions, or (veterinary) universities. Also, much genetic information on Cryptosporidia and on gp40 is available digitally in public sequence databases such as NCBL's GenBank and EMBL's EBI. A public database specialised in sequences from Cryptosporidia is CryptoDB, which is available online at: cryptodb.org.

For the invention "gp40" is a protein comprising the amino acid sequence of SEQ ID NO: 1 or a homologue thereof. The same sequence is also presented in FIG. 1, in 1 letter IUPAC code. This particular sequence corresponds to the core sequence of the gp40 protein, from amino acid number 31 through number 220 from GenBank accession number AAF78345.1 (Strong et al., 2000, supra). This GenBank entry presents the amino acid sequence of the 60 kDa precursor protein from *C. parvum*, strain Iowa, which is an isolate from a bovine in the USA, and is of genotype II.

In nature gp40 is expressed as a precursor glycoprotein, whereby the N-terminal ⅔rd of the precursor is gp40, and the C-terminal ⅓rd is gp15. The precursor has an N-terminal signal sequence, and a poly-serine tract (both in the gp40 part), as well as a C-terminal GPI-anchor (in gp15). After cleavage of the precursor, the two proteins interact and attach to the apical surface region of merozoite- and sporozoite stages of Cryptosporidia, where they are involved in attachment to- and invasion of host cells. In nature gp40 is heavily glycosylated, mainly with O-linked GalNac structures on threonine and serine amino acids.

The gene encoding the precursor protein of gp40 from *C. parvum* is described as gene number: cgd6_1080 in the CryptoDB database (supra).

A "homologue" of a Cryptosporidium gp40 polyprotein for the invention is a protein comprising an amino acid sequence that has an amino acid sequence identity of at least 60% with SEQ ID NO: 1, when aligned to the full length of SEQ ID NO: 1. Sequence alignment must be done using the 'blastp' algorithm with standard parameters, from the NCBI BLAST™ suite of alignment software as is available online at: blast.ncbi.nlm.nih.gov.

This spread in sequence identity level is needed to cover the natural variance in the amino acid sequence of Cryptosporidium gp40 proteins for the invention, which are well-known to be quite heterogenic (see also Strong et al., 2000, supra). For example, even among gp40 proteins from *C. parvum*, genotype II isolates, there is a variation of up to 23% in amino acid sequence identity level over the sequence of SEQ ID NO: 1. This is a result from on the one hand some dispersed amino acid sequence variation, and on the other from variations in the length of the poly-serine tract. This poly-serine tract in Cryptosporidium gp40 can have between 6 and 25 consecutive serines, while these are all functional gp40 proteins. See for example the *C. parvum* gp40 genotype II homologues in GenBank accession numbers AOA32955.1 (6 serines), and ACR78128.1 (25 serines). When aligned to the full length of SEQ ID NO: 1 using the blastp program, these show respectively 77 and 96% amino acid sequence identity.

Further variation in gp40 amino acid sequence occurs in *C. parvum* genotype I isolates. As described in Table 1 of Strong et al. (2000, supra): the amino acid identity between the gp15/45/60 precursor proteins from type I and type II isolates can be as low as 67%, while still being functional gp40 proteins.

On the topic of *Cryptosporidium parvum* gp40 diversity see also: Leav et al., 2002, Inf. and Imm., vol. 70, p. 3881-3890; and: Wu et al., 2003, Appl. Environ. Microbiol., vol. 69, p. 4720-4726.

Yet a further level of variability in gp40 amino acid sequence derives from gp40 homologues from closely related species such as *C. hominis*, for which the amino acid sequence identity with SEQ ID NO: 1 goes down to about 60%.

However all these homologous gp40 proteins can be used in the present invention.

In order to be capable of being alkylated by incubation with an aziridine for the invention, a homologue of a Cryptosporidium gp40 possesses at least one amino acid selected from: cysteine, methionine, serine, threonine, tyrosine, lysine, arginine, valine, glutamic acid, and aspartic acid.

The term "comprise" (as well as variations such as "comprising", "comprises", and "comprised") as used herein, intends to refer to all elements, and in any possible combination conceivable for the invention, that are covered by or included in the text section, paragraph, claim, etc., in which this term is used, even if such elements or combinations are not explicitly recited; and not to the exclusion of any of such element(s) or combinations.

Thus, any such text section, paragraph, claim, etc., can therefore also relate to one or more embodiment(s) wherein the term "comprising" (or its variants) is replaced by terms such as "consist of", "consisting of", or "consist essentially of".

An "alkylated amino acid" for the invention is an amino acid in which a sulphur-, nitrogen- or oxygen atom has been alkylated by reaction with an aziridine, so that the amino acid has come to possess an additional alkyl group as compared to that amino acid's native structural formula. Alkylated amino acids regard for example: a cysteine amino acid, of which the sulfhydryl group of the side-chain was alkylated into an alkylen-thioether, or a methionine amino acid of which the thio-ether of the side-chain was alkylated into a tertiary thio-ether; a lysine or arginine, of which the amino group of the side-chain was alkylated into an alkyl-amine group; or a serine, threonine, tyrosine, glutamic acid, or aspartic acid, of which the hydroxy group of the side chain was alkylated into an alkyl-ether.

The alkylation reaction that occurs upon incubation with an aziridine, will be dependent on the availability of such amino acids for the reaction. For example, when two cysteines are connected by a sulphur-bridge, they will-under non-reducing conditions-not be available for alkylation. On the other hand, amino acids of which one of its groups would not normally react, may become alkylated on their amino- or carboxy-group, when such group is exposed, for example at the N- or C-terminal end of a protein-fragment. For example, when a gp40 protein, or a part thereof, initiates with a valine, then the N-terminally exposed amino group of that valine can become alkylated in a reaction with an aziridine.

As the skilled person will appreciate, a part of a Cryptosporidium gp40 protein comprising one or more alkylated amino acids according to the invention may equally be used for the induction of increased levels of gp40-specific antibodies in an immunised target. The part of the gp40 protein is required to be an "immunogenic part" of the gp40 protein in the sense that it must be capable of inducing gp40-specific antibodies which can be used to protect against Cryptosporidiosis. This is provided among others by the part having one or more alkylated amino acids, as described herein.

A skilled person can readily determine if a part of a gp40 protein or of a homologue thereof is such an immunogenic part by immunisation of a target, and testing if gp40-specific antibodies were generated.

To assure immunogenic efficacy for the invention, the immunogenic part of a Cryptosporidium gp40 protein comprising one or more alkylated amino acids, has at least 50 consecutive amino acids from SEQ ID NO:1, and comprises at least one alkylated amino acid selected from: a glutamic acid corresponding to that of amino acid number (aa. no.) 88 or 94 of SEQ ID NO: 1; and an aspartic acid corresponding to that of aa. no. 129 of SEQ ID NO: 1.

For the invention "corresponding to" in the feature 'an amino acid corresponding to that of amino acid number', refers to the amino acid that is in a comparable position, and/or in a comparable context of amino acids, as in the amino acid sequence of the indicated sequence identifier.

The Cryptosporidium gp40 protein or the immunogenic part thereof according to the invention, can each be modified in different ways as is well-known in this field. Examples are glycosylation, lipidation, or pegylation. Also a further section of a protein may be added, such as a carrier, hapten, a signal sequence, an anchor sequence, a marker, or a tag. Any of these modifications may be useful in the expression, the detection, and/or the purification of the protein. Also such a modification may be helpful in adapting or further increasing the immunogenicity.

For example, the Examples provided hereafter, describe the use of Cryptosporidium gp40 protein comprising one or more alkylated amino acids, with a C-terminal 6x-Histidine tag. While this tag had no effect on immunogenicity, it allowed the purification of the gp40 protein by metal affinity chromatography, for example when the protein was in a harvest of a recombinant expression system.

The coding sequence of the N-terminus of the gp40 protein used in the vaccination experiments described in the Examples, had been elongated with a part of the native signal sequence, and encoded an N-terminal Methionine to initiate its transcription. This improved expression levels in a baculovirus-insect cell expression system, without inducing secretion from the insect cells.

The amino acid sequence of the Cryptosporidium gp40 protein used in the Examples is provided in SEQ ID NO: 3. This protein comprises the whole amino acid sequence of SEQ ID NO:1 with the indicated additional N- and C-terminal sequences: it was expressed from a recombinant gene that provides for the His tag, the additional methionine and the partial signal sequence. In addition, this gene encoding a gp40 for the invention had been codon-optimised towards the codon-preference of the baculovirus AcMNPV polyhedrin gene. The encoding nucleotide sequence is provided in SEQ ID NO: 2.

The alkylation of the Cryptosporidium gp40 protein, or the immunogenic part thereof, with an aziridine provides for an increased immunogenicity of the protein of the part thereof. The term 'immunogenicity' is well known in this field and refers to the capacity of a compound to induce a protective immuneresponse in a target. The immuneresponse induced can be of the humoral- and/or of the cellular type, and the protection can be achieved in different ways, as described below. Immunogenicity in regard to vaccination, is also referred to as 'potency'.

An increase of the immunogenicity of a protein can readily be determined by a skilled person by performing a comparative immunisation experiment. For the invention this could mean comparing the immune response in a non-human animal immunised with a Cryptosporidium gp40 protein comprising one or more alkylated amino acids according to the invention, to that of an animal immunised with a gp40 that did not comprise one or more alkylated amino acids, whereby all other parameters and conditions are substantially the same. In line with the invention, the increased immunogenicity will result in a higher amount of gp40-specific antibodies being generated in the target's serum by the Cryptosporidium gp40 protein comprising one or more alkylated amino acids, as compared to a similar dose of the gp40 that did not comprise one or more alkylated amino acids. The level and the specificity of the seroresponse can readily be measured by any suitable serodiagnostic technique, such as ELISA, IFT or AlphaLisa. For an optimal comparison of the effect of the invention, the gp40 that did not comprise one or more alkylated amino acids should be mock incubated, i.e. incubated under the same conditions as the aziridine-incubation, except that no aziridine would be present.

For example, when immunising a bovine once, with 10 µg of gp40, either alkylated or mock-treated, with a standard oily adjuvant, the Cryptosporidium gp40 protein comprising one or more alkylated amino acids according to the invention will induce a titre of gp40-specific antibody that is 2-4 Log 2 units higher, when measured in a standard antibody ELISA using coated gp40, as compared to the titre generated by the gp40 that did not comprise one or more alkylated amino acids; this is an increase of the titre of gp40-specific antibodies up to 16 fold, resulting from the alkylation by the aziridine.

For the invention, gp40-specific antibodies are antibodies that recognise and bind to gp40 in a way that is 'specific'. In this field that means that the binding and recognition are correlated to the concentration of the antibody and of the antigen. Consequently, in case of a specific binding, a dilution of either the antigen or the antibody should display a gradual decrease of the level of binding as is detectable in a standard serological assay.

Details of embodiments and of further aspects of the invention will be described below.

In an embodiment of the Cryptosporidium gp40 protein according to the invention, a homologue is a protein comprising an amino acid sequence that has an amino acid sequence identity of at least 60% with SEQ ID NO: 1, when aligned to the full length of SEQ ID NO: 1, as defined herein.

More preferably a homologue of a Cryptosporidium gp40 protein for the invention has an amino acid sequence identity of at least 62, 65, 67, 70, 72, 75, 77, 80, 82, 85, 87, 90, 91, 92, 93, 94, 95, 96, 97, 98, or even at least 99% amino acid sequence identity with SEQ ID NO: 1, when aligned to the full length of SEQ ID NO: 1, in this order of preference.

In an embodiment of the Cryptosporidium gp40 protein or of the immunogenic part thereof according to the invention, the alkylated amino acid is one or more selected from the group consisting of: cysteine, methionine, serine, threonine, tyrosine, lysine, arginine, valine, glutamic acid, and aspartic acid.

These amino acids are all well-known chemical compounds, the unincorporated chemical substance of (the L-isomer of) which are: cysteine: CAS Registry number: 52-90-4; methionine: CAS no.: 59-51-8; serine: CAS no.: 56-45-1; threonine: CAS no.: 80-68-2; tyrosine: CAS no.: 60-18-4; lysine: CAS no.: 56-87-1; arginine: CAS no.: 74-79-3; valine: CAS no.: 72-18-4; glutamic acid: CAS no.: 56-86-0; and aspartic acid: CAS no.: 56-84-8.

The alkylation of the sulfhydryl group of the side-chain of a cysteine results in the cysteine having an alkylen-thioether, whereby an alkylen-amine group replaced the hydrogen atom from the sulfhydryl group.

The alkylation of the thio-ether group of the side-chain of a methionine results in the methionine having a tertiary thio-ether, whereby an alkylen-amine group replaced the hydrogen atom from the thio-ether group.

The alkylation of the amino group of the side-chain of an arginine or lysine results in the arginine or lysine having an alkylen-amine group attached to the amine-side group.

The alkylation of the hydroxy group of the side-chain of a serine, threonine, tyrosine, aspartic acid, or glutamic acid, results in the serine, threonine, tyrosine, glutamic acid, or aspartic acid, having an alkylen-amine attached as an alkyl-ether.

The alkylation of the amino group of a valine, results in the valine having an alkylen-amine attached to the amine-group.

In a preferred embodiment, the alkylen-amine attached by the reaction with the aziridine is an ethylenimine group.

In an embodiment of the Cryptosporidium gp40 protein or of the immunogenic part thereof according to the invention, the alkylated amino acid is alkylated with an alkyl group of Formula (2)

$$
\begin{array}{c}
R_3'' \quad R_3' \\
\diagdown \diagup \\
\cdots \text{C} \\
\diagup \diagdown \\
R_2'' \quad R_2'
\end{array}
\quad
\begin{array}{c}
H \\
| \\
N \\
| \\
R_1
\end{array}
\tag{2}
$$

wherein R1 is selected from the group consisting of: H, alkyl, alkylsulfonyl, mesyl, tosyl, nosyl, brosyl, alkenyl, alkynyl, alkylaryl, arylalkyl, and cycloalkyl, wherein each of the alkyl, alkenyl, alkynyl, alkylaryl, arylalkyl, and cycloalkyl is optionally substituted with a substituent selected from the group consisting of: carbonyl, hydroxyl, alkyl, and haloalkyl. Preferably, R1 is selected from the group consisting of H, acetyl, and hydroxyethyl.

R2' and R2" are each independently selected from H and alkyl. Suitably R2' and R2" are each independently selected from H and $C_{1-6}$ alkyl. Preferably, R2' and R2" are each independently selected from the group consisting of H, methyl, ethyl, propyl, isopropyl, butyl, and isobutyl. Preferably at least one of R2' and R2" is H. Preferably R2' and R2" is H.

R3' and R3" are each independently selected from the group consisting of H and alkyl. Suitably R3' and R3" are each independently selected from H and $C_{1-6}$ alkyl. Preferably, R3' and R3" are each independently selected from H, methyl, ethyl, propyl, isopropyl, butyl, and isobutyl. Preferably at least one of R3' and R3" is H. Preferably R3' and R3" is H.

In an embodiment of the Cryptosporidium gp40 protein or the immunogenic part thereof the alkyl has 1-20 carbon atoms, preferably 1-10 carbon atoms, more preferably from 1-6 carbon atoms and most preferably from 1-3 carbon atoms. Preferably the alkenyl, alkynyl, and cycloalkyl have 2-20 carbon atoms, preferably 2-10 carbon atoms, more preferably 2-6 carbon atoms and most preferably 2-3 carbon atoms. Suitably the aryl has 5-12 carbon atoms, preferably 5-10 carbon atoms, more preferably 6-10 carbon atoms.

In an embodiment of the Cryptosporidium gp40 protein or the immunogenic part thereof according to the invention, the alkylated amino acid is alkylated with an alkylgroup of Formula (2) wherein
  R1 is H;
  R2' is H;
  R2' is ethyl;
  R1 is acetyl;
  R2' is methyl;
  R1 is ethanol;
  R2' isobutyl;
  R2" is H;
  R3' is H; or
  R3" is H.

In a preferred embodiment of the Cryptosporidium gp40 protein or the immunogenic part thereof according to the invention, the alkyl group of Formula (2), has one of the combinations of substituents from the group of:
  R1 is H, R2' is H, R2" is H, R3' is H, and R3" is H;
  R1 is C(═O)CH3, R2' is H, R2" is H, R3' is H, and R3" is H;
  R1 is H, R2' is $CH_2CH_3$, R2" is H, R3' is H, and R3" is H;
  R1 is H, R2' is $CH_3$, R2" is H, R3' is H, and R3" is H;
  R1 is $CH_2CH_2OH$, R2' is H, R2" is H, R3' is H, and R3" is H; and
  R1 is H, R2' is $C(CH_3)_3$, R2" is H, R3' is H, and R3" is H.

In an embodiment of the Cryptosporidium gp40 protein or of the immunogenic part thereof according to the invention, the alkylated amino acid is one or more selected from the group consisting of: valine, glutamic acid, and aspartic acid.

As described in the Examples, further analyses have shown these amino acids of the gp40 to become preferentially alkylated by incubation with an aziridine.

As described above, the Cryptosporidium gp40 protein according to the invention comprises the amino acid sequence of SEQ ID NO: 1 or a homologue thereof. Consequently the alkylated amino acids preferably comprised are the amino acids corresponding to E88, E94, and D129 of SEQ ID NO: 1. NB: E and D are the amino acid codes of respectively glutamic- and aspartic acid, in 1-letter IUPAC code. Thus: "E88" refers to a glutamic acid at aa. no. 88, etc.

In a preferred embodiment, the gp40 protein of the invention comprises a section of SEQ ID NO: 3 that incorporates SEQ ID NO: 1. More preferably gp40 comprises aa. no. 19-207 of SEQ ID NO: 3; aa. no. 15-207; 10-207; 5-207; 4-207; 3-207; 2-207; or even 1-207 of SEQ ID NO: 3, in this order of preference.

As described in the Examples, one form of the gp40 protein according to the invention found after recombinant expression and aziridine incubation comprised aa. no. 2-207 of SEQ ID NO: 3. Apparently the partial signal sequence had not been cleaved off, but the N-terminal methionine had been cleaved, leaving the valine at position 2 (V2) exposed at the N-terminus of the gp40. Interestingly, that valine had also become alkylated by the aziridine incubation.

Therefore, in an embodiment of the Cryptosporidium gp40 protein or of the immunogenic part thereof according to the invention, and of the alkylated amino acid selected from valine, glutamic acid, and aspartic acid, the valine is a valine corresponding to that of amino acid number (aa. no.) 2 of SEQ ID NO: 3; the glutamic acid is a glutamic acid corresponding to that of aa. no. 106 or to that of aa. no. 112 of SEQ ID NO: 3; and/or the aspartic acid is an aspartic acid corresponding to that of aa. no. 147 of SEQ ID NO: 3.

In a further aspect the invention regards a composition comprising the Cryptosporidium gp40 protein or the immunogenic part thereof, both according to the invention.

As described, the Cryptosporidium gp40 protein and the immunogenic part thereof according to the invention, comprising alkylated amino acids, can be prepared by incubation with an aziridine as described herein.

Therefore in a further aspect of the invention, the Cryptosporidium gp40 protein or the immunogenic part thereof, according to the invention, are obtainable by incubating a composition comprising a Cryptosporidium gp40 protein or an immunogenic part thereof, with an aziridine.

Similarly, and in a further aspect, the invention regards a method for the preparation of the Cryptosporidium gp40 protein or of the immunogenic part thereof, according to the invention, the method comprising the step of incubating a composition comprising a Cryptosporidium gp40 protein, or an immunogenic part thereof, with an aziridine.

NB: Aziridines are toxic and mutagenic chemicals which must be stored, handled, and discarded in a safe and compliant manner. Aziridines can be neutralised by incubation with a thiosulfate, for example sodium thiosulfate ($Na_2S_2O_3$).

The aziridine ring is a three membered heterocycle consisting of one amine- and two methylene groups. An "aziridine" is an organo-chemical compound containing an aziridine ring, and has the structural Formula (1):

$$\underset{R_3'\quad R_2''}{\overset{R_3''\quad R_2'}{\underset{}{\bigtriangleup}}} \overset{R_1}{\underset{}{N}} \quad (1)$$

R1 is selected from the group consisting of: H, alkyl, alkylsulfonyl, mesyl, tosyl, nosyl, brosyl, alkenyl, alkynyl, alkylaryl, arylalkyl, and cycloalkyl, wherein each of the alkyl, alkenyl, alkynyl, alkylaryl, arylalkyl, and cycloalkyl is optionally substituted with a substituent selected from the group consisting of: carbonyl, hydroxyl, alkyl, and haloalkyl. Preferably, R1 is selected from the group consisting of H, acetyl, and hydroxyethyl.

R2' and R2" are each independently selected from H and alkyl. Suitably R2' and R2" are each independently selected from H and $C_{1-6}$ alkyl. Preferably, R2' and R2" are each independently selected from the group consisting of H, methyl, ethyl, propyl, isopropyl, butyl, and isobutyl. Preferably at least one of R2' and R2" is H. Preferably R2' and R2" is H.

R3' and R3" are each independently selected from the group consisting of H and alkyl. Suitably R3' and R3" are each independently selected from H and $C_{1-6}$ alkyl. Preferably, R3' and R3" are each independently selected from H, methyl, ethyl, propyl, isopropyl, butyl, and isobutyl. Preferably at least one of R3' and R3" is H. Preferably R3' and R3" is H.

Suitably the alkyl has 1-20 carbon atoms, preferably 1-10 carbon atoms, more preferably from 1-6 carbon atoms and most preferably from 1-3 carbon atoms. Preferably the alkenyl, alkynyl, and cycloalkyl have 2-20 carbon atoms, preferably 2-10 carbon atoms, more preferably 2-6 carbon atoms and most preferably 2-3 carbon atoms. Suitably the aryl has 5-12 carbon atoms, preferably 5-10 carbon atoms, more preferably 6-10 carbon atoms.

Much used aziridines for the inactivation of micro-organisms are ethylenimine (R1=H) and 1-acetyl-ethylenimine (R1=acetyl).

In an embodiment of the Cryptosporidium gp40 protein or the immunogenic part thereof obtainable according to the invention, as well as of the method for the preparation of the Cryptosporidium gp40 protein or of the immunogenic part thereof according to the invention, the aziridine is an aziridine of Formula (1) wherein R1 is H or is acetyl.

In an embodiment of the Cryptosporidium gp40 protein or the immunogenic part thereof obtainable according to the invention, as well as of the method for the preparation of the Cryptosporidium gp40 protein or of the immunogenic part thereof according to the invention, the aziridine is an aziridine of Formula (1) wherein R1 is H;
R2' is H;
R2' is ethyl;
R1 is acetyl;
R2' is methyl;
R1 is ethanol;
R2' isobutyl;
R2" is H;
R3' is H; or
R3" is H.

The aziridine ring is very reactive, and can open up by reaction of one of the methylenes, e.g. with a protein, resulting in the alkylation of a sulfhydryl group. Cysteine amino acids are readily alkylated by an aziridine. At alkaline pH also the thio-ether of a methionine can be alkylated by an aziridine.

Upon the alkylation of a protein by an aziridine for the invention, the opened ring of the aziridine becomes attached to one or more of its amino acids as an alkyl group. For example one amino acid is alkylated with an alkyl group of Formula (2), whereby in Formula (2) the dotted line represents the bond to the amino acid.

$$\underset{R_2''\quad R_2'}{\overset{R_3''\quad R_3'}{\underset{}{\bigtriangleup}}}\overset{H}{\underset{}{N}}-R_1 \quad (2)$$

R1 is selected from the group consisting of: H, alkyl, alkylsulfonyl, mesyl, tosyl, nosyl, brosyl, alkenyl, alkynyl, alkylaryl, arylalkyl, and cycloalkyl, wherein each of the alkyl, alkenyl, alkynyl, alkylaryl, arylalkyl, and cycloalkyl is optionally substituted with a substituent selected from the group consisting of: carbonyl, hydroxyl, alkyl, and haloalkyl. Preferably, R1 is selected from the group consisting of H, acetyl, and hydroxyethyl.

R2' and R2" are each independently selected from H and alkyl. Suitably R2' and R2" are each independently selected from H and $C_{1-6}$ alkyl. Preferably, R2' and R2" are each independently selected from the group consisting of H, methyl, ethyl, propyl, isopropyl, butyl, and isobutyl. Preferably at least one of R2' and R2" is H. Preferably R2' and R2" is H.

R3' and R3" are each independently selected from the group consisting of H and alkyl. Suitably R3' and R3" are each independently selected from H and $C_{1-6}$ alkyl. Preferably, R3' and R3" are each independently selected from H, methyl, ethyl, propyl, isopropyl, butyl, and isobutyl. Preferably at least one of R3' and R3" is H. Preferably R3' and R3" is H.

In an embodiment of the Cryptosporidium gp40 protein or the immunogenic part thereof obtainable according to the invention, as well as of the method for the preparation of the Cryptosporidium gp40 protein or of the immunogenic part thereof according to the invention, the aziridine is an aziridine of Formula (1) having one of the combinations of substituents from the group of:

R1 is H, R2' is H, R2" is H, R3' is H, and R3" is H;
R1 is C(=O)CH3, R2' is H, R2" is H, R3' is H, and R3" is H;
R1 is H, R2' is $CH_2CH_3$, R2" is H, R3' is H, and R3" is H;
R1 is H, R2' is $CH_3$, R2" is H, R3' is H, and R3" is H;
R1 is $CH_2CH_2OH$, R2' is H, R2" is H, R3' is H, and R3" is H; and
R1 is H, R2' is $C(CH_3)_3$, R2" is H, R3' is H, and R3" is H.

In a preferred embodiment of the aziridine for the invention, one of the conditions applies selected from:
ethylenimine is preferably CAS nr. 151-56-4,
2-ethyl-ethylenimine is preferably CAS nr. 2549-67-9,
1-acetyl-ethylenimine is preferably CAS nr. 460-07-1,
2-methyl-ethylenimine is preferably CAS nr. 75-55-8,
1-ethylenimine-ethanol is preferably CAS nr. 1072-52-2, and
2-isobutyl-ethylenimine is preferably CAS nr. 3647-37-8.

As described, such incubation with an aziridine results in the alkylation of a Cryptosporidium gp40 protein or of an immunogenic part thereof, specifically of amino acids selected from: cysteine, methionine, serine, threonine, tyrosine, lysine, arginine, valine, glutamic acid, and aspartic acid. This alkylation in turn provides such protein or part thereof with an increased immunogenicity.

For the Cryptosporidium gp40 protein or the immunogenic part thereof, obtainable according to the invention, as well as for the method for the preparation of the Cryptosporidium gp40 protein or of the immunogenic part thereof, according to the invention, the "incubating" involves common procedures, such as combining aqueous compositions comprising the indicated components, and allowing them to interact during a certain time, and under certain conditions. Relevant conditions for this incubation are those that result in a detectable increase of immunogenicity of the gp40 protein or the part thereof. Such incubation with an aziridine can be performed with a wide variety of conditions and parameters, all well known to the person skilled in the field of the invention, and readily available for optimisation and adaptation by routine methods when required.

For example said incubation can be performed at a wide range of temperatures. Preferably the incubation with an aziridine is performed at a temperature above zero degrees Celsius, more preferably between 1 and 55° C., between 5 and 50° C., between 10 and 40° C., or even between 15 and 40° C., in this order of preference.

Similarly, the incubation with an aziridine can be performed at a wide variety of pH values. Most effective will however be an incubation at a pH value that is not very acidic, as the alkylation of amino acids by an aziridine may be less efficient at very acidic pH levels.

Therefore in an embodiment of said method the incubation with an aziridine is performed at a pH above 4, more preferably at a pH above 4.5, 5, 5.5, 6, 6.5, 7, or even at a pH above 7.5, in this order of preference.

The upper limit of the pH value for the incubation with an aziridine in the method is readily determined in relation to the other parameters of the incubation. Preferably the incubation with an aziridine is performed at a pH below 12, below 10, or even below 9, in this order of preference.

As the skilled person will appreciate, because the aziridine gets consumed during the incubation reaction, its concentration can only be indicated with certainty at the start of the incubation.

Therefore, in an embodiment of the Cryptosporidium gp40 protein or the immunogenic part thereof, obtainable according to the invention, as well as of the method for the preparation of the Cryptosporidium gp40 protein or of the immunogenic part thereof, according to the invention, the concentration of the aziridine at the start of the incubation is at least 0.1 milliMolar, more preferably at least 0.2, 0.3, 0.5, 1.0, 1.5, 2.0, 2.5, 3.0, 3.5, 4.0, 4.5, 5, 6, 7, 8, 9, 10, 11, 12, 13, 15, 20, 30, 40 or even at least 50 milliMolar, in this order of preference.

The upper limit for the concentration of the aziridine can readily be determined. In an embodiment the concentration of the aziridine at the start of the incubation is below 1 Molar, below 0.5 Molar, or even below 0.1 Molar, in this order of preference.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, the duration of the incubation of the composition comprising the protein or fragment thereof and the aziridine, is at least 10 minutes, more preferably at least 20, 30, 40, 50, 60 minutes, 1.5 hours, 2, 3, 4, 5, 6, 8, 10, 12, 15, 24, or even at least 36 hours, in this order of preference. In an embodiment the duration is overnight (i.e. 12-18 hours).

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, an additional step is performed after the incubation with an aziridine, which step provides for the neutralisation of any remaining aziridine.

In a preferred embodiment, the neutralisation step is performed by the addition to the incubation-mixture after the incubation reaction, of an appropriate amount of a thiosulphate, and incubation for an appropriate length of time to complete the neutralisation. For example: neutralisation by the addition of between 10 and 100 mM sodium-thiosulphate, and incubation for between 15 and 90 minutes, at between 15 and 30° C.

In practice, the amount of thio-sulphate used for the neutralisation will be a small overdose. This serves as an assurance: when some thiosulphate remains after the neutralisation reaction, it is certain that all of the aziridine is gone.

In an embodiment of the Cryptosporidium gp40 protein or the immunogenic part thereof obtainable according to the invention, as well as of the method for the preparation of the Cryptosporidium gp40 protein or of the immunogenic part thereof according to the invention, the aziridine is selected from: ethylenimine (R1=H), 2-ethyl-ethylenimine (R2'=ethyl), 1-acetyl-ethylenimine (R1=acetyl), 2-methyl-ethylenimine (R2'=methyl), 1-ethylenimine-ethanol (R1=ethanol), and 2-isobutyl-ethylenimine (R2'=isobutyl).

In a preferred embodiment of the aziridine for the invention, one of the conditions applies selected from:
  ethylenimine is preferably CAS nr. 151-56-4,
  2-ethyl-ethylenimine is preferably CAS nr. 2549-67-9,
  1-acetyl-ethylenimine is preferably CAS nr. 460-07-1,
  2-methyl-ethylenimine is preferably CAS nr. 75-55-8,
  1-ethylenimine-ethanol is preferably CAS nr. 1072-52-2, and
  2-isobutyl-ethylenimine is preferably CAS nr. 3647-37-8.

Because an aziridine is such a dangerous chemical, it is preferably used in the incubation for the invention, in a diluted form.

For ethylenimine this can conveniently be achieved by employing so-called 'binary ethylenimine' (BEI). BEI is the reaction product of the cyclization of bromoethylamine-hydrobromide (BEA) in alkaline conditions and under mild heating, e.g. to about 37° C. The alkaline conditions can conveniently be provided by the addition of e.g. sodium-hydroxide. All this is well-known in this field, see e.g. Bahnemann 1990 (supra).

Therefore, in a preferred embodiment of the Cryptosporidium gp40 protein or the immunogenic part thereof, obtainable according to the invention, as well as of the method for the preparation of the Cryptosporidium gp40 protein or of the immunogenic part thereof, according to the invention, the aziridine is ethylenimine, or is binary ethylenimine.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, an additional step is performed before the incubation with an aziridine, and in which BEI is generated.

Next an appropriate amount of the generated BEI is then used as the aziridine for the incubation with the composition comprising the Cryptosporidium gp40 protein or the immunogenic part thereof.

Preferably the BEI is generated from the reaction of BEA with a hydroxide.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, the gp40 protein, or the immunogenic part thereof, is from *C. parvum*; more preferably from a *C. parvum* of genotype II.

For the invention "from *C. parvum*" indicates that the amino acid sequence of the gp40 protein or the part thereof, is based on a gp40 protein from the species *C. parvum*, either directly by isolation of the protein or the encoding nucleic acid; or indirectly, e.g. based on sequence information from such *C. parvum* gp40 protein.

The Cryptosporidium gp40 protein or the immunogenic part thereof for the invention is thus preferably an isolated protein, meaning that it is not in its natural context in or on a live Cryptosporidium parasite.

The composition comprising the Cryptosporidium gp40 protein or the immunogenic part thereof for use in the incubation with aziridine for the invention, can be produced in different ways, among which is isolation from Cryptosporidium parasites obtained from a live infected host organism. Also the protein or the part thereof can be produced in a cell-free transcription system.

However, most convenient and scalable to industrial production levels is the production of the Cryptosporidium gp40 protein or of the immunogenic part thereof for use in the invention, by way of in vitro expression, using a recombinant expression system. Such an expression system can employ a cell-culture system, of prokaryotic- or eukaryotic cells that have been genetically manipulated to express the desired protein. Alternatively the cells can be the host for a recombinant microorganism, such as a virus that induces the cells to express the desired protein. Examples of recombinant expression systems are: genetically modified Chinese hamster ovary (CHO) cells, bacteria such as: *E. coli*, a *Bacillus* species or *Staphylococcus carnosus*; or a yeast species e.g. *Saccharomyces cerevisiae* or *Pichia pastores*. Examples of the use of a recombinant virus for expression from a host cell are: baculovirus-insect cell-, or adenovirus-mammalian cell systems.

Therefore in an embodiment of the Cryptosporidium gp40 protein or the immunogenic part thereof, obtainable according to the invention, as well as of the method for the preparation of the Cryptosporidium gp40 protein or of the immunogenic part thereof, according to the invention, an additional step is performed for the production of the composition comprising the gp40 protein or the part thereof by way of a recombinant expression system; preferably by way of a baculovirus-insect cell expression system.

The baculovirus-insect cell expression system is well known since the 1980's, for a review see Chambers et al., 2018, Curr. Protoc. Protein Sci., vol. 91, p. 5.4.1-5.4.6.

More preferred is the production by a baculovirus-insect cell expression system of the Cryptosporidium gp40 protein by the expression of the recombinant DNA sequence of SEQ ID NO: 2 as heterologous insert for the recombinant baculovirus.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, wherein the composition comprising the gp40 protein or the part thereof (before aziridine incubation), is produced by way of a baculovirus-insect cell expression system, said composition is harvested from the insect cell culture, e.g. as a whole culture, or as a part of such culture, e.g. the supernatant or the cell-pellet after centrifugation of the insect cell culture, or a filtrate or retentate after filtration.

More preferred, the composition comprising the Cryptosporidium gp40 protein or the immunogenic part thereof is the supernatant or filtrate of a baculovirus-insect cell expression system culture. The supernatant can be obtained after gravity settling of the culture, e.g. by standing overnight or by centrifugation; the filtrate is what passes through the filter upon filtration.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, wherein the composition comprising the gp40 protein or the part thereof is produced by way of a recombinant expression system, an additional step is performed after producing and harvesting of said composition from the expression system, and before incubation with the aziridine, which step comprises the purification of said composition. Preferably the purification is by way of column chromatography. More preferably the gp40 protein or the part thereof comprise a tag that facilitates the purification of said composition by column chromatography, such as a Histidine tag for metal affinity chromatography.

Because the incubation with an aziridine is also an effective means for the chemical inactivation of a micro-organism, therefore the preparation of the alkylated protein or the alkylated immunogenic part thereof for the invention can conveniently be combined with the inactivation of a micro-organism, for example a virus or a bacterium.

Therefore, in an embodiment of the Cryptosporidium gp40 protein or the immunogenic part thereof, obtainable according to the invention, as well as of the method for the preparation of the Cryptosporidium gp40 protein or of the immunogenic part thereof, according to the invention, the composition comprising the Cryptosporidium gp40 protein or the immunogenic part thereof also contains a micro-organism. The micro-organism can e.g. be a *C. parvum* parasite inactivated with an aziridine; while this inactivates the parasite, it also makes that the gp40 protein becomes alkylated. Preferably the micro-organism is a virus or a bacterium, e.g. such as is used in a recombinant expression system.

The conditions for the inactivation of many micro-organisms using an aziridine are well-known in the art. Any desired adaptation or optimisation can readily be performed by routine methods.

In an embodiment of the Cryptosporidium gp40 protein or the immunogenic part thereof, obtainable according to the invention, as well as of the method for the preparation of the Cryptosporidium gp40 protein or of the immunogenic part thereof, according to the invention, one or more of the conditions apply, selected from the group consisting of:

the incubation with an aziridine is performed at a temperature above zero degrees Celsius, more preferably between 1 and 55° C., between 5 and 50° C., between 10 and 40° C., or even between 15 and 40° C., in this order of preference;

the incubation with an aziridine is performed at a pH above 4, more preferably at a pH above 4.5, 5, 5.5, 6, 6.5, 7, or even at a pH above 7.5, in this order of preference;

the incubation with an aziridine is performed at a pH below 12, below 10, or even below 9, in this order of preference;

the concentration of the aziridine at the start of the incubation is at least 0.1 milliMolar, more preferably of at least 0.2, 0.3, 0.5, 1.0, 1.5, 2.0, 2.5, 3.0, 3.5, 4.0, 4.5, 5, 6, 7, 8, 9, 10, 11, 12, 13, 15, 20, 30, 40, or even at least 50 milliMolar, in this order of preference;

the concentration of the aziridine at the start of the incubation is below 1 Molar, below 0.5 Molar, or even below 0.1 Molar, in this order of preference;

the duration of the incubation of the composition comprising the protein or fragment thereof and the aziridine, is at least 10 minutes, more preferably at least 20, 30, 40, 50, 60 minutes, 1.5 hours, 2, 3, 4, 5, 6, 8, 10, 12, 15, 24, or even at least 36 hours, in this order of preference; in an embodiment the duration is overnight (i.e. 12-18 hours);

an additional step is performed after the incubation with an aziridine, which step provides for the neutralisation of any remaining aziridine; in a preferred embodiment the neutralisation is performed by the addition to the incubation-mixture of an appropriate amount of a thiosulphate;

the aziridine is selected from: ethylenimine, 2-ethyl-ethylenimine, 1 acetyl-ethylenimine, 2-methyl-ethylenimine, 1-ethylenimine-ethanol, and 2-isobutyl-ethylenimine;

for the aziridine, one of the conditions applies selected from:
ethylenimine is preferably CAS nr. 151-56-4,
2-ethyl-ethylenimine is preferably CAS nr. 2549-67-9,
1-acetyl-ethylenimine is preferably CAS nr. 460-07-1,
2-methyl-ethylenimine is preferably CAS nr. 75-55-8,
1-ethylenimine-ethanol is preferably CAS nr. 1072-52-2, and
2-isobutyl-ethylenimine is preferably CAS nr. 3647-37-8;

the aziridine is ethylenimine, or is binary ethylenimine;

an additional step is performed before the incubation with an aziridine, and in which BEI is generated; next an appropriate amount of the generated BEI is then used as the aziridine for the incubation with the composition comprising the Cryptosporidium gp40 protein or the immunogenic part thereof; preferably the BEI is generated from the reaction of BEA with a hydroxide;

the gp40 protein, or the immunogenic part thereof, is from *C. parvum*; more preferably from a *C. parvum* of genotype II;

an additional step is performed for the production of the composition comprising the protein or the part thereof which is to be incubated with aziridine in a later step of the method, by way of a recombinant expression system; preferably by way of a baculovirus-insect cell expression system; more preferred is the production by a baculovirus-insect cell expression system of the Cryptosporidium gp40 protein by the expression of the recombinant DNA sequence of SEQ ID NO: 2 as heterologous insert;

the composition comprising the Cryptosporidium gp40 protein or the immunogenic part thereof which is produced by way of a baculovirus-insect cell expression system, is harvested from the insect cell culture, e.g. as the whole culture, or as the supernatant or the cell-pellet after centrifugation of the insect cell culture, or as a filtrate or retentate;

the composition comprising the Cryptosporidium gp40 protein or the immunogenic part thereof is the supernatant or filtrate of a baculovirus-insect cell expression system culture;

an additional step is performed after producing and harvesting of the composition comprising the protein or the part thereof by way of a recombinant expression system, which step comprises the purification of said composition; preferably the purification is by way of column chromatography; more preferably the Cryptosporidium gp40 protein or the immunogenic part thereof comprise a tag that facilitates the purification of said composition by column chromatography, such as a Histidine tag for metal affinity chromatography; and the composition comprising the Cryptosporidium gp40 protein or the immunogenic part thereof also contains a micro-organism; preferably the micro-organism is a virus or a bacterium.

Therefore, in a preferred embodiment of the Cryptosporidium gp40 protein or the immunogenic part thereof, obtainable according to the invention, one or more or all of the features are applied, selected from:

the aziridine is ethylenimine or is binary ethylenimine,
the Cryptosporidium gp40 is from *Cryptosporidium parvum*,
the composition comprising the Cryptosporidium gp40 protein or the immunogenic part thereof is the supernatant or filtrate from a baculovirus-insect cell expression system culture, and
said supernatant or filtrate is purified by column chromatography.

Similarly, in a preferred embodiment of the method for the preparation of the Cryptosporidium gp40 protein or of the immunogenic part thereof, according to the invention, one or more or all of the features is applied, selected from:
the aziridine is ethylenimine or is binary ethylenimine,
the Cryptosporidium gp40 is from *Cryptosporidium parvum*,
the composition comprising the Cryptosporidium gp40 protein or the immunogenic part thereof is the supernatant or filtrate from a baculovirus-insect cell expression system culture, and
said supernatant or filtrate is purified by column chromatography.

As described, the invention provides the immunogen for a safe and effective vaccine against Cryptosporidiosis. The Cryptosporidium gp40 or the immunogenic part thereof according to the invention, comprising one or more alkylated amino acids, are especially useful in that regard, because they have an increased immunogenicity.

Therefore in a further aspect the invention regards the Cryptosporidium gp40 protein or the immunogenic part thereof according to the invention, or as obtainable according to the invention, or as obtainable by the method according to the invention, for use in a vaccine for the protection of a human- or non-human animal target against Cryptosporidiosis.

Similarly, in a further aspect the invention regards the use of the Cryptosporidium gp40 protein or the immunogenic part thereof according to the invention, or as obtainable according to the invention, or as obtainable by the method according to the invention, for the manufacture of a vaccine for the protection of a human- or non-human animal target against Cryptosporidiosis.

A "vaccine" is well known to be a composition comprising an immunogen and a pharmaceutically acceptable carrier. The immunogen causes an immunological response in the vaccinated target, which response is effective in protecting against a disease or against an infection or its consequences. The protection regards reducing the load or shortening the duration of the replication of a pathogen against which the vaccination is directed. In turn this leads to a reduction in the vaccinated target of the number, the intensity, or the severity of lesions, associated symptoms, and clinical signs of disease caused by the pathogen.

The determination of the effectiveness of a vaccine according to the invention, is well within the skills of the routine practitioner, and can be done for instance by monitoring the immunological response following vaccination or by testing the appearance of clinical symptoms or of mortality after a challenge infection, e.g. by monitoring the targets' signs of disease, clinical scores, serological parameters, or by re-isolation of the challenge pathogen, and comparing these results to a vaccination-challenge response seen in mock vaccinated animals. Many ways to measure and characterise relevant pathogens, their symptoms and diseases are known in the art.

The Cryptosporidium gp40 protein or the immunogenic part thereof according to the invention, for use in a vaccine according to the invention, as well as the use of these for the manufacture of a vaccine according to the invention, are effective in the protection against "Cryptosporidiosis". This term refers to the collection of symptoms caused by infection of a susceptible target with a Cryptosporidium parasite. Mainly such symptoms regard diarrhoea, but some species of the parasite can also induce a respiratory disease. For the symptoms of veterinary Cryptosporidiosis, see "The Merck veterinary manual" (supra).

For the invention the "protection . . . against Cryptosporidiosis" regards a reduction of the severity and/or the duration of diarrhoea caused by a Cryptosporidium parasite. The vaccine according to the invention is effective in that regard as demonstrated in the Examples section.

The protection is generated in the vaccinated target itself. Also, when immunising a mammalian target, protection can be generated indirectly, by colostral transfer. This regards collecting the milk from a vaccinated pregnant mammal around the time of giving birth, and feeding that milk (or antibodies derived therefrom) to a target human- or non-human animal.

The result of this protection is a restoration of the general health of the (passively) vaccinated targets. In the veterinary field the protection against Cryptosporidiosis leads to increased economic performance in (passively) vaccinated animals which is reflected in one or more parameters of: reduced mortality, better average daily weight gain, improved feed conversion, improved milk production, improved reproductive yields, and/or reduced costs for healthcare.

In addition to reduction of symptoms of disease, specifically of diarrhoea, the protection regards a reduction of the chance of infection with Cryptosporidium parasites by the reduction of the shedding of oocysts by vaccinated targets into the environment of a herd or a population, and within a geographical area. Consequently, the protection of the invention also leads to a reduction of the prevalence of Cryptosporidium parasites.

In a preferred embodiment of the Cryptosporidium gp40 protein or the immunogenic part thereof according to the invention, for use in a vaccine according to the invention, as well as of the use of these for the manufacture of a vaccine according to the invention, the vaccine is for the protection of a ruminant; more preferably for the protection of newborn bovines by colostral transfer.

For the invention, a "ruminant" regards any ruminant of relevance to veterinary science or to commercial farming operations. Preferably this refers to bovine, caprine, ovine or cervine animals. More preferred are bovines, goats, and sheep. Most preferred ruminant is a bovine animal.

A "bovine" for the invention is taurine cattle (Bos taurus), zebu cattle (Bos indicus), buffalo, bison, yak, or wisent. The bovine can be of any type: dairy or beef, or parental stock for dairy- or beef type.

To achieve the protection against Cryptosporidiosis as described, the Cryptosporidium gp40 protein or the immunogenic part thereof according to the invention, comprising one or more alkylated amino acids, is formulated and administered as a vaccine.

Therefore in a further aspect the invention regards a vaccine for a human- or non-human animal target against Cryptosporidiosis, said vaccine comprising the Cryptosporidium gp40 protein or the immunogenic part thereof according to the invention, or as obtainable according to the invention, or as obtainable by the method according to the invention, and a pharmaceutically acceptable carrier.

A "pharmaceutically acceptable carrier" assists in the manufacture, administration, and/or conservation of a vaccine, without causing (severe) adverse effects. Such a carrier can be an aqueous solution, for example water, a buffer, or a culture medium.

A preferred pharmaceutically acceptable carrier for the vaccine according to the invention is an insect cell culture medium, or a buffer such as saline, PBS, or 50 mM HEPES.

In addition the pharmaceutically acceptable carrier can comprise further additives and excipients, such as a filler, stabiliser, preservative, or adjuvant. Details and examples are well-known, for instance as described in handbooks such as: "Remington: the science and practice of pharmacy" (2000, Lippincott, USA, ISBN: 683306472), and: "Veterinary vaccinology" (P. Pastoret et al. ed., 1997, Elsevier, Amsterdam, ISBN 0444819681).

In addition, the vaccine according to the invention may comprise an adjuvant. Especially for subunit vaccines this further increases the target's immune response against the subunit antigen.

Therefore in an embodiment the vaccine according to the invention is characterised in that it comprises an adjuvant.

An "adjuvant" is a well-known vaccine ingredient that stimulates the immune response of a target in a non-specific manner. Many different adjuvants are known in the art. Examples of adjuvants are:

complete- or incomplete Freund's adjuvant, vitamin E or alpha-tocopherol, non-ionic block polymers and polyamines such as dextran sulphate, Carbopol™, pyran, Saponin, such as: Quil A™, or Q-Vac™ Saponin and vaccine components may be combined in an ISCOM™.

Furthermore, peptides such as muramyl dipeptides, dimethylglycine, tuftsin, are often used as adjuvant, and mineral oil e.g. Bayol™, Drakeol™, Klearol™, or Marcol™, Montanide™ or light mineral (paraffin) oil; non-mineral oil such as squalene, squalane; vegetable oils or derivatives thereof, e.g. ethyl-oleate. Also combination products such as ISA™ (Seppic), or DiluvacForte™ and Xsolve™ (both MSD Animal Health) can advantageously be used. A further option is the use of SVEA adjuvant (comprising squalane and vitamin E-acetate) as disclosed in WO 2018/115435.

A handbook on adjuvants and their uses and effects is: "Vaccine adjuvants" (Methods in molecular medicine, vol. 42, D. O'Hagan ed., 2000, Humana press, NJ, ISBN: 0896037355).

In an embodiment of the vaccine according to the invention the adjuvant is one or more selected from an aluminium-salt and an oil. The oil is a mineral oil, or is a non-mineral oil; preferably the oil is a mineral oil. The aluminium salt is preferably an aluminium-hydroxide Much used mineral oil adjuvant in veterinary vaccines is a light (or white) liquid paraffin oil, such as Drakeol® 6VR (Penreco), Marcol® 52 (Exxon Mobile), and Klearol® (Sonneborn). Alternative is a premixed mineral oil/emulsifier mixture such as the Montanide® range from Seppic, France.

Common non-mineral oil adjuvants are squalene and squalane (shark liver oil), ethyl oleate, and tocopherol (Vitamin E). The oil phase may contain excipients such as an emulsifier and stabilisers.

Common emulsifiers for vaccines are sorbitan monooleate (Span® 80) and polyoxyethylene-sorbitan-monooleate (polysorbate 80, or Tween® 80). Common emulsion-stabilisers are benzyl alcohol, and triethanolamine.

Much used aluminium salt is aluminium-hydroxide, for example as: Alhydrogel™ (Brenntag Biosector), Rehydragel™ (Reheis), and Rehsorptar™ (Armour Pharmaceutical).

The vaccine with an oily adjuvant can be formulated as an emulsion of a watery- and an oily phase; preferably the emulsion is of a type selected from: water-in-oil (w/o), oil-in-water (o/w), water-in-oil-in-water (w/o/w), and double oil-emulsion (o/w/o).

More preferred is a vaccine according to the invention that is adjuvated with an oil, and is formulated as a water-in-oil emulsion.

Therefore, in an embodiment of the vaccine according to the invention, the vaccine is formulated as a water-in-oil emulsion.

In a preferred embodiment of the vaccine according to the invention comprising an adjuvant, the adjuvant comprises an oil; preferably the oil is a light paraffin oil.

More preferably the adjuvant also comprises an aluminium salt; the aluminium salt is preferably an aluminium-hydroxide.

In a preferred embodiment of the vaccine according to the invention, said vaccine is for the vaccination of a pregnant mammal. Preferably the pregnant mammal is a ruminant, more preferably a bovine animal.

This will allow the collection of colostrum from said mammal around the time of delivery, which colostrum than can be used to provide passive protection against Cryptosporidiosis to a human- or non-human animal by the feeding of that colostrum, or of antibodies therefrom.

The vaccine according to the invention can be administered to a human- or non-human target by different routes of application.

In an embodiment, the vaccine according to the invention is administered by parenteral route, i.e. through the skin, e.g.: intramuscular, intraperitoneal, intradermal, submucosal, or subcutaneous. Preferred route of administration is by intradermal-, intramuscular- or subcutaneous route.

The volume per dose of the vaccine according to the invention can be selected according to the characteristics of the specific vaccine applied, the characteristics of the target, and the intended route of application. Parenteral injection is commonly done with a dose of 0.01-10 ml/target. For an adult bovine, the preferred volume per dose is 0.5 ml for subcutaneous route, and 1-2 ml for i.m. route.

The advantageous effect of the alkylation by an aziridine for the invention is that a lower amount of the Cryptosporidium gp40 protein or the immunogenic part thereof according to the invention, needs to be used in a vaccine dose, as compared to gp40 protein, or a part thereof, that does not comprise one or more alkylated amino acids, while still obtaining a good level of protection. The selection of the amount of the gp40 protein or the part thereof per dose can be made by the skilled person, based on characteristics of the vaccine and of the target.

Therefore in an embodiment the vaccine according to the invention comprises between 0.01 and 50 micrograms of the Cryptosporidium gp40 protein or the immunogenic part thereof according to the invention, per vaccine dose. Preferably the vaccine comprises between 0.05 and 20 µg, between 0.1 and 10, or even between 0.1 and 5 µg of the Cryptosporidium gp40 protein or the immunogenic part thereof according to the invention per dose, in this order of preference.

Most preferred, the vaccine comprises 0.5-2 µg of the Cryptosporidium gp40 protein or the immunogenic part thereof according to the invention, per dose for an adult bovine.

In an embodiment of the vaccine according to the invention, wherein the vaccine is intended for the vaccination of a bovine, the vaccine comprises less than 10 µg of the Cryptosporidium gp40 protein or the immunogenic part thereof according to the invention per dose. Preferably the vaccine according to the invention, intended fora bovine, comprises less than 9, 8, 7, 6, 5, 4, 3, or even less than 2 μg of the Cryptosporidium gp40 protein or the immunogenic part thereof according to the invention, per dose.

Most preferred, the vaccine comprises 1 μg of the Cryptosporidium gp40 protein or the immunogenic part thereof according to the invention, per dose for an adult bovine.

The amount of the Cryptosporidium gp40 protein or the immunogenic part thereof according to the invention per dose, can be analysed in the ready vaccine emulsion. This can be done by using standard biochemical laboratory procedures, for example by breaking the emulsion, and testing the water-phase using SDS-PAGE. Determining protein amounts is then done by comparing to known amounts of a reference protein, e.g. an albumin. See e.g.: The Protein Protocols Handbook, 2nd edition, September 2002, ed. J. M. Walker, Humana Press Inc., Totowa, NJ; Chapter 29, p. 237-242.

Preferably the amount of the Cryptosporidium gp40 protein or the immunogenic part thereof according to the invention is determined by an antigenic mass ELISA, such as is described hereinafter. Alternatively protein quantification can be done by using liquid chromatography, such as HPLC, or by mass-spectrometry.

Preferably the amount of the Cryptosporidium gp40 protein or the immunogenic part thereof according to the invention per dose is determined in the aqueous phase of the vaccine according to the invention, before mixing with an aluminium salt and/or before emulsification with an oily phase.

The administration regimen for the vaccine according to the invention is selected based on the type of protection that is intended: vaccination in order to provide active protection of the vaccinated target itself, or vaccination in order to generate colostrum for passive vaccination.

Active vaccination of a target can mobilise humoral and cellular immune responses, and can be timed as is convenient. It can be performed irrespective of the age, weight, sex, immunological status, and other parameters of the target to be vaccinated. The active vaccination can be given as a single dose, which can e.g. be followed up by a booster vaccination at about two weeks later, with subsequent yearly re-vaccinations.

However passive vaccination via colostral transfer is almost exclusively antibody mediated. Therefore the vaccination for the generation of such colostrum needs to be timed in regard to the anticipated date of giving birth, in order to obtain high levels of gp40-specific antibodies in the colostrum. For the different species of mammals the duration of their pregnancy is known, therefore the timing of this vaccination can be selected and optimised. For the generation of colostrum in cows, a pregnant cow is preferably vaccinated twice with the vaccine according to the invention: a booster vaccination in the period of 1-4 weeks before expected calving, and a priming vaccination 1-12 weeks before the booster vaccination. Preferably: the booster vaccination is given at 2-4 weeks before expected calving, and priming at 2-6 weeks before the booster vaccination. When a cow has already received priming- and booster vaccinations for a previous pregnancy, it may suffice to administer only a single vaccination for subsequent pregnancies, to be given in the period between 1 and 12 weeks before expected calving; preferably 2-8 weeks before expected calving.

Preferably, the method, timing, and volume of the administration of the vaccine according to the invention is integrated into existing vaccination schedules of other vaccines that the target human- or non-human animal may require, in order to reduce stress to the target and to reduce labour costs. These other vaccines can be administered in a simultaneous, concurrent, or sequential fashion, and in a manner compatible with their licensed use.

In a preferred embodiment the vaccine according to the invention is administered to a pregnant bovine, and is given in combination with other vaccines intended for the protection of new-born calves against neonatal diarrhoea by colostral transfer. Examples of such other vaccines are: Guardian® (Merck Animal Health) a W/O emulsion comprising a mineral oil adjuvant, which is administered subcutaneously; and: Rotavec® Corona (MSD Animal Health), a W/O emulsion which comprises as adjuvant both a mineral oil and an aluminium salt, and is administered intramuscularly. Preferred method of combination is so-called 'associated non-mixed' use.

Depending on the target animal, the disease aimed at, and the route of administration, etc., it may be desired to adapt elements of the vaccine according to the invention or its administration. This is well within the capabilities of a skilled person, and generally involves the fine-tuning of the efficacy of the vaccine. This can be done by adapting e.g. the vaccine dose, quantity, frequency, route, excipients, etc.

It goes without saying that admixing other compounds, such as stabilisers, carriers, adjuvants, diluents, emulsions, and the like to vaccines according to the invention are also within the scope of the invention. Such additives are described in well-known handbooks such as: "Remington", and "Veterinary Vaccinology" (both supra).

For the vaccine according to the invention it can be advantageous to make further combinations with additional immunoactive components. This can serve to enhance the immune protection already provided, or to expand it to other pathogens.

Therefore, in an embodiment, the vaccine according to the invention comprises at least one additional immunoactive component.

Such an "additional immunoactive component" may be an antigen, an immune enhancing substance, an adjuvant or immunomodulator, a cytokine, another vaccine, or any combination thereof. This provides advantages in terms of cost, efficiency and target welfare. Alternatively, the vaccine according to the invention, may itself be added to another vaccine.

General techniques and considerations that apply to the manufacture of vaccines under well-known standards for pharmaceutical production are described for instance in governmental directives and regulations (Pharmacopoeia, 9CFR) and in well-known handbooks ("Veterinary vaccinology" and: "Remington", both supra). Commonly such vaccines are prepared sterile, and are prepared using excipients of pharmaceutical quality grade.

Such preparations will incorporate microbiological tests for sterility, and absence of extraneous agents; and may include studies in vivo or in vitro for confirming efficacy and safety. After completion of the testing for quality, quantity, sterility, safety and efficacy, the vaccine can be released for sale. All these are well known to a skilled person.

Therefore in a further aspect the invention regards a method for the manufacture of the vaccine according to the invention, the method comprising the step of formulating the Cryptosporidium gp40 protein or the immunogenic part thereof according to the invention, or as obtainable according to the invention, or as obtainable by the method according to the invention, into a vaccine.

Such formulation may comprise the simple admixing of the gp40 protein or the immunogenic part thereof with a pharmaceutically acceptable carrier. Also this may comprise the admixing with an adjuvant as described, including the emulsification, and/or the admixing with at least one additional immunoactive component.

A variant of a vaccine against Cryptosporidiosis according to the invention is the colostrum that is generated by a pregnant mammal that was immunised with the vaccine according to the invention. This colostrum is highly effective for the passive vaccination of human- or non-human animal targets against Cryptosporidiosis. The colostrum can be fed to or drunk by the target, and provides intestinal, mucosal, and/or systemic immune-protection against Cryptosporidiosis. Alternatively antibodies derived from such colostrum can be administered.

The colostrum can be generated by vaccination of the pregnant mammal before delivery, with the vaccine according to the invention.

Therefore in a further aspect the invention regards a method for the production of colostrum comprising antibodies against the Cryptosporidium gp40 protein or the immunogenic part thereof according to the invention, or as obtainable according to the invention, or as obtainable by the method according to the invention, the method comprising the steps of:
  a. vaccinating a pregnant mammal at least once with the vaccine according to the invention, and
  b. collecting colostrum from the mammary glands of said mammal.

As is well-known, "colostrum" is the milk that is secreted by the mammary glands of a mammal in the period around delivery.

Preferably the colostrum for the invention is the milk secreted in the period from 1 day before to 4 days after delivery; more preferably from 1 hour to 72 hours after delivery.

More preferably the colostrum according to the invention is secreted by a ruminant; even more preferably by a bovine animal as defined herein. Even more preferably the colostrum according to the invention is collected from said bovine with the first, second, third and fourth milkings after calving.

In an embodiment of the method for the production of colostrum according to the invention, the target is a ruminant; preferably the target is a bovine, as defined herein.

The colostrum according to the invention contains antibodies against the Cryptosporidium gp40 protein or against the immunogenic part thereof, according to the invention, which antibodies are higher in concentration and/or different in avidity or specificity as compared to antibodies in colostrum from a mammal vaccinated with a gp40 protein or part thereof that did not comprise one or more alkylated amino acids.

The vaccination of the pregnant mammal is preferably performed according to a vaccination regimen as described herein.

The collection of the colostrum is preferably done between 1 day before delivery and 4 days after delivery, more preferably starting on day of delivery and for at least 3 days, as described herein.

In a further aspect the invention regards a colostrum obtainable by the method for the production of colostrum according to the invention, for use in the protection of a human- or non-human animal target against Cryptosporidiosis.

In a preferred embodiment of the colostrum for use according to the invention, the protection is achieved by feeding to the target of the colostrum, or of antibodies derived from the colostrum.

As described, the invention relates both to active- and to passive vaccination regimens against Cryptosporidiosis.

In a further aspect the invention regards to a method for the protection of a human- or non-human animal target against Cryptosporidiosis, said method comprising administering to said target at least once the vaccine according to the invention.

In a further aspect the invention regards a method for the protection of a human- or non-human animal target against Cryptosporidiosis, said method comprising feeding of the colostrum as obtainable by the method according to the invention, or of the colostrum according to the invention, to said target.

A method of protection using colostrum for the invention, also regards the passive vaccination of a target using a preparation of gp40-specific antibodies that were purified from a colostrum as obtainable by the method according to the invention, or from a colostrum according to the invention.

When the method of passive protection regards cattle, a further distinction can be made for the different methods of animal husbandry that are applied to cattle for different purposes: calves from dairy cattle will commonly be removed from their mothers at the day of birth, so for these calves the vaccination by administering the colostrum, is done by active collection of colostrum, and by feeding that to the calves during the first week of their lives. Preferably the dairy calves will receive the colostrum according to the invention for at least 3 days, more preferably for at least 4, or even for at least 5 days, in that order of preference. The first dose of colostrum should be administered to the calves within 8 hours after birth, preferably within 6, or even within 4 hours after birth.

The feeding of the colostrum may be done once or twice daily; preferably the feeding is done once daily.

In beef cattle, because of their lower volume of milk produced, the concentration of antibodies in colostrum is higher than in dairy cattle. Also calves from beef cattle are usually left with their mothers after birth. In that case the feeding of the colostrum for the method of protection according to the invention is done by letting the calves ingest the colostrum by suckling. Preferably the beef calves are allowed to suckle colostrum from a cow vaccinated as described herein, for at least 3 days, more preferably for at least 4, or even for at least 5 days, in that order of preference. Access of the calves to suckle colostrum should be provided within 8 hours after birth, preferably within 6, or even within 4 hours after birth.

In an embodiment of both methods for the protection according to the invention, the target is a ruminant; preferably the target is a bovine, as defined herein.

The invention will now be further described by the following, non-limiting, examples.

EXAMPLES

Example 1: Production of Cryptosporidiosis Vaccine 1.1. The Recombinant Protein Construct The recombinant gp40 protein for use in vaccination studies was constructed starting from the core amino acid sequence of SEQ ID NO: 1, which derives from an C.

*parvum*, strain Iowa, genotype II. This sequence was extended with a C-terminal 6× Histidine tag, to allow for purification by Nickle column chromatography.

For Cryptosporidium gp40 protein, the cleavage of the N-terminal signal sequence is known to be different in an expression system where cleavage is at amino acid no. 20; as compared to the native gp40 protein which starts at amino acid no. 31, see O'Connor et al. (2007, Mol. Bioch. Parasit., vol. 152, p. 149-158). For the invention, the N-terminal gp40 signal sequence was partially restored, by using amino acids 14-30 from GenBank entry AAF78345.1.

In addition an N-terminal methionine was added to initiate transcription. This assembly could be expressed efficiently in a recombinant baculovirus-insect cell expression system, although it did not allow for secretion or glycosylation. Consequently, expression was cytoplasmatic, and gp40 could be harvested from the culture supernatant at the end of the culturing period when most insect cells were lysed.

The exact amino acid sequence of the Cryptosporidium gp40 protein used in vaccination experiments is that of SEQ ID NO: 3. This was expressed from a recombinant DNA that had been codon-optimised based on the codon-preference of the AcMNPV baculoviral polyhedrin gene; the rec. DNA sequence used was that of SEQ ID NO: 2. This recombinant gene was inserted as a BamH1-EcoR1 fragment into a pVL1393 plasmid-based baculovirus transfervector, which drives expression from the polyhedrin promoter. Stably transfected recombinant baculovirus was generated by homologous recombination with linearized AcMNPV genomic DNA, using standard procedures. Recombinant baculovirus expressing His-tagged recombinant Cryptosporidium gp40 protein (rgp40His) was isolated, plaque purified, and amplified.

Rgp40His expression was confirmed by SDS-Page of insect cell culture supernatant, which displayed the expressed protein as a band of about 32 kDa. Further tests were done by Western blot and immunofluorescence assay using a bovine polyclonal anti-gp40 antiserum, and an anti-His monoclonal antibody. The recombinant baculovirus was laid down as master seed virus after several tests for genetic correctness and -stability, and sterility.

1.2. Expression and Harvesting

Rgp40His was produced from Sf9 insect cells infected with the recombinant baculovirus seed. The cells were cultured in commercial animal-compound free insect cell culture medium SF900II™. Small scale cultures of 0.5-2 litres were done in laboratories; large scale production runs up to 500 L cultures were done in pre-production facilities. In general the following schedule was applied: clean Sf9 cells were produced in cultures of increasing volume. When enough clean cells were produced, the cells were concentrated and reseeded in fresh medium at $1.6 \times 10^{\wedge}6$ cells/ml. These were infected with an m.o.i. of 0.002, and incubated for 5 days at 28° C. At the end of the culture, the supernatant was harvested; at small scale by centrifugation, at large scale this was by clarification by deep-filtration. When expressed at small scale, the recombinant baculovirus was then inactivated using an incubation with 0.1% Triton® X-100 for 1 hour at room temperature, followed by gamma-irradiation by a commercial company. When produced at large scale, all downstream processing was done in contained facilities and using closed connections, and the bulk of the recombinant baculovirus was removed by the different filtration and purification steps. Any remaining virus was then killed-off during the aziridine treatment.

For purification, the harvested rgp40His was loaded onto a Ni-Sepharose column. Next the column was washed, and rgp40His was eluted using imidazol. Next the imidazol was removed by diafiltration against 50 mM HEPES buffer at pH 7.5. Next the rgp40His was sterile filtered over 0.2 μm membrane filters, and incubated with aziridine. BEI was prepared from combining equal volumes of 1.09 M BEA and 1.91 M NaOH. This generated a stock-solution of 545 mM BEI. Then the BEI was added to the composition comprising the rgp40His to 33 mM. The mixture with BEI was incubated at room temperature for 24 hours. Next sodium-thiosulphate was added at 33 mM. This was incubated for an hour at room-temperature, and pH was measured to be 7.1.

For comparative experiments, Cryptosporidium gp40 that did not comprise one or more alkylated amino acids, was produced in the same way, except that a buffer was added instead of an aziridine, for a mock incubation.

1.3. Antigenic Mass Determination

The amount of rgp40His protein was initially measured by SDS-PAGE along a dilution range of known amounts of a reference protein. Using densitometry of stained gels, bands were then quantified. This test was replaced later by a more precise one: a competitive antigenic mass ELISA, that was fully validated for specificity, robustness, linearity, and precision. In short the antigenic mass ELISA was performed as follows: wells of a micro-titration plate were coated with purified rgp40His (not alkylated), at 50 ng/well, overnight in coating buffer and at 4° C. Next day the plate was washed, post-coated with a casein-containing buffer for 1 hour at 37° C., and then washed again. On separate microtitration plates a test sample of rgp40His of unknown concentration was serially diluted in ELISA buffer (containing 0.05% polysorbate 80), and a fixed amount of an anti-gp40 mouse monoclonal antibody was added. This was pre-incubated for 1 hour at 37° C., then this mixture was transferred to the coated plates, and incubated for 1 hour at 37° C., in ELISA buffer. Plates were then washed, and the amount of gp40 monoclonal antibody that was bound to the plate was detected by incubation with a peroxidase-conjugated goat-anti-mouse IgG, in Elisa buffer for 1 hour at 37° C. The peroxidase was visualised by enzymatic conversion of tetramethylbenzidine for 15 minutes at room temperature, which reaction as stopped using sulphuric acid. The optical density of the yellow colour in each well was measured at 450 nm. The amount of peroxidase-conjugate is inversely correlated to the amount of antigen in the test sample. This was processed by a software program using a Logit-Log algorithm, for at least 3 sample points from a dilution series. Also samples were measured at least in duplicate, and appropriate positive and negative controls were taken along in the test. A value for the antigenic mass of gp40 in the test sample was then calculated in micrograms/ml, based on standardised reference sample values.

1.4. Formulation into a Vaccine

The rgp40His, column-purified, and aziridine-incubated or mock-incubated, was then formulated as an emulsion vaccine for further use, by combination with suitable adjuvants and emulsification, all using well-known methods and materials. In short: the rgp40His was taken up into sterile saline (0.85% w/v sodium chloride) to the required concentration. In parallel the oil-phase was prepared of ISA™ 70 VG (Seppic, France) by sterile filtration. Both phases are combined and emulsified using a Silverson™ or Dispax™ homogeniser, into a water-in-oil emulsion. The gradual increase of temperature during the homogenisation is monitored and kept to below 50° C. The resulting emulsion was stored at 4° C. until filling into appropriate containers. The filled product is subjected to a variety of tests for stability and sterility before release.

Depending on the intended geographical market or the combination with other antigens, batches of the emulsion were also prepared that included a further adjuvant, specifically aluminium-hydroxide. In that case: the aqueous rgp40His preparation was first combined with a heat-sterilised suspension of 3% w/v Alhydrogel® (Brenntag) in saline, and left to absorb to the aluminium for 30-60 minutes at room temperature while stirring. Subsequently this mixture of antigen and aluminium was then emulsified with the oil phase as described above.

Long term stability tests of 1- and 2-year shelf-life at 4° C. are ongoing. Indicative however are the results of intermediate and expedited stability tests: for 15 months at 4° C., and for 3 weeks at 30 or 37° C. Emulsion quality remained to be good throughout, and the average change in antigenic mass found was within 10% from the start composition. This is a good indication of long-term stability under cooled conditions.

Example 2: Set-Up of the Vaccination-Challenge Trials

Over a number of years, several trials in experimental animals were performed to develop and optimise a model for effective vaccination-challenge trails to be able to evaluate the potency of the various compositions that were tested as Cryptosporidiosis vaccines. The following set-up proved most indicative of in vivo potency:

Vaccines were prepared as described above: Cryptosporidiosis gp40 protein was expressed in the baculovirus-insect cell expression system and was harvested at the end of the culture, purified (or not) by metal-affinity chromatography, and incubated (or not) with an aziridine. The protein was then formulated with an adjuvant, either an oil, or an oil and an aluminium salt, and emulsified as a W/O emulsion.

2.1. Animal Model

For passive vaccination studies, target animals were healthy dairy cattle, of Holstein-Friesian type, from about one year old and selected from both heifers and multiparous cows. The cows were in their last trimester of pregnancy and their serum was tested for having only background levels of gp40-specific antibodies. The cows were treated at the farm where they lived, therefore no acclimatisation was necessary. Feed and water were provided according to standard cattle management practice. Animals were marked by unique life number, via ear tag.

2.2. Vaccinations

Vaccines were administered, containing 10 mg rgp40His/dose, either aziridine treated or mock treated, emulsified as W/O with mineral oil, in a 2 ml volume, and administered intra-muscularly in the neck. Timing was: booster at 3 weeks before expected calving date, and priming at 6 weeks before booster. The cows also received a vaccination with Rotavec® Corona vaccine at 4 weeks before expected calving date, to prevent new-born diarrhoea in the calves from pathogens other than C. parvum. Serum samples were taken at specific time points and tested by antibody ELISA.

After calving, colostrum was collected as the first, second and third milking; on average 4 to 5 litres of colostrum could be obtained per milking per cow. Colostrum was pooled per vaccination test group, per milking timepoint and aliquoted in 250 ml jars, before pasteurization using a water bath for 30-45 minutes at 56° C. The aliquots were then divided and kept frozen until use. Thawing was controlled by using a water bath set at 43° C. or using hand warm tap water whilst regularly checking the water temperature. The colostrum was hand warm (i.e. approximately 40° C.) when given to the calves.

Neonatal calves were collected at calving, housed individually, and fed a 3 litre bolus of anti-gp40 colostrum, from one of the vaccine groups, within 4 hours of birth. Next the calves received a challenge dose of live C. parvum oocysts at 2 hours after the first feed.

Group sizes were 5-10 calves, and a non-protected challenged group was included in all experiments, which group received mock colostrum. The use of non-protected non-challenged sentinels was found not to be informative, and was left out in later experiments. Calves included in the studies were at least 30 kg bodyweight at birth.

The calves were kept in an isolated facility, in single-animal boxes. Contact between calves was not allowed. Caretakers changed gloves and footwear before treating each animal.

Each single animal box consisted of two compartments. One contained wood shavings and one consisted of a metal grid above a horizontal smooth surface plate above the waste collection channel. Calves were kept on wood shavings during the first three days of life. At the end of day three the calves were moved to the second compartment. The smooth surface plate provided the ability to assess faecal consistency, to determine the diarrhoea score. This plate was cleaned after each scoring time point in order for the next scoring to be on the faecal material that was produced between each scoring time point.

The calves received feeding twice daily; consisting of colostrum (first feed) or colostrum and milk replacer from second feed onward was given daily according to the manufacturers specifications after the colostrum was first given to the calf.

2.3. Challenges

The challenge inoculum was prepared fresh before administration, with $1 \times 10^{\wedge}6$ live C. parvum, strain Iowa oocysts/calve. This was given to calves orally in 50 ml milk replacer. Subsequently the calves received twice daily feeding of (gp40- or control-vaccine) colostrum in milk replacer: 0.25 to 0.5 litres of colostrum in a total of 2-2.5 litres of milk per day, for several days.

This challenge dose was selected to cause a repeatable and consistent diarrhoea, that was severe (but transient) in all of the unprotected challenge controls.

Live oocysts were purchased fresh from Waterborne Inc., New Orleans, USA. The oocysts were freshly shed, no older than 2 months before the start of the animal experiment. The parasite viability by means of excystation (test criterion is 50-100%), plus infectivity of an HCT-8 cell layer, were found to be sufficient both before the start, and at the end of the experiment.

After challenge, calves were monitored for 14 days, at which diarrhoea typically developed between days 4-11, with a peak in severity from days 5-10. Antibody levels were measured in the colostrum and in the calves' serum at day 1 before feeding and at day 3 of feeding.

2.4. Scoring of Effects

Several methods were tested over time to best quantify and assess the effect of the vaccination on the challenge infection. Initially only bull calves were used, and faeces were collected in bags from all calves to be analysed for amount and consistency. This proved inaccurate as calves would lie down when sick, and material got lost. Most clinically relevant proved to be the twice daily recording of a number of observational scoring-parameters, specifically for: general health, dehydration, backside appearance, and diarrhoea score. The diarrhoea scoring parameters used, were based on the Wisconsin-Madison scale as described in S. McGuirk, 2008 (Vet. Clin. North Am. Food Anim. Pract., vol. 24, p. 139-153). The parameters used for the observations are represented in Table 1. With some experience, animal caretakers were able to determine the scores consistently.

When diarrhoea became prominent, a test for Cryptosporidia in faeces was applied, which was done using a commercial test kit: BIO K306™—Rainbow Calf Scours (Bio-X Diagnostics, Belgium), which employs fluid chromatography on specific test strips.

Counting of oocysts in faecal samples was done to determine reduction of shedding. Oocysts counting was as follows: from collected faeces a 50 ml sample was taken and stored at 2-8° C. until use. The sample was serially diluted, and a sample was put on a diagnostic microscopic slide and allowed to dry by air for 1 hour. The slides were stained according to Ziehl-Neelsen (acid fast) method and red-stained oocysts were counted by light-microscopy. Results were expressed as oocysts per gram faeces.

TABLE 1

Observational parameters for the scoring of signs of Cryptosporidiosis in calves

| Score | General health | Dehydration | Backside appearance | Diarrhoea score |
|---|---|---|---|---|
| 0 | Normal: The calf is alert, hungry, and watches the caretakers. It may stretch when it gets up. The calf will eat greedily, often twitching its tail as it eats. | not dehydrated: (eyes normal, elastic skin (smooth fur). | clean backside, tale and legs. | Normal: faeces retain form. The faeces may be pasty but do not flow across a tilted surface. |
| 1 | Mildly depressed: The calf rises and drinks without coaxing, but not greedily. The calf pays some attention to the caretakers. | possibly: doubtful eyes, dull/glazed fur. | tale and backside dirty with some sticky faeces or dry faecal material. | Mild: form is a puddle, not a patty. Sufficient water content to slowly flow across or down a tilted surface. |
| 2 | Moderately depressed: The calf must be coaxed to drink or does not consume all the milk. It pays little attention to the caretaker until touched. | moderately: eyes too deep, or dull/ tarnished fur. | tale and backside very dirty but not wet, drying. | Moderate: faeces with sufficient water content to easily flow across or down a tilted surface, while leaving some adherent material. |
| 3 | Severely depressed: The calf must be coaxed to get up, may have difficulty rising or standing, does not pay attention to caretakers when touched, may refuse to eat, no suckling reflex. | severe: eyes lie very deep, and dull/ tarnished fur. | tale, backside and legs dirty and wet from watery diarrhoea. | Severe: part or all of faeces are very watery. Faeces can drain away leaving little or no residual on a smooth tilted surface (a calf may have very watery faeces followed by some solid material and still have severe diarrhoea). |
| 4 | Dead or moribund: The calf does not or hardly respond to stimuli, lateral recumbence. | — | — | — |

Example 3: Results of the Vaccination-Challenge Experiments 3.1. Recombinant Expression of pp40:

The baculovirus-insect cell expression system with the optimisations applied: the partial signal sequence, and the codon-usage adaptation, was found to yield more protein that the previously used *E. coli* expression system did. However, when vaccinating with crude gp40 harvest from insect cell-cultures, i.e. only centrifuged and inactivated with Triton X-100 and gamma-irradiation, the immunogenicity for a standard 20 µg dose was not as good as for a similar dose of similarly inactivated and column purified gp40. Therefore His-tag fusion constructs and Nickle column purification were used as standard.

3.2. Set-Up of Vaccine Formulation

The oil– and the oil+ aluminium adjuvants used, both induced effective antibody titres in the pregnant cows, and subsequently in their colostrum. However, for cattle that had not previously received a vaccination with gp40, a single vaccination did not suffice, and prime-boost vaccination regimen was required for inducing the levels of antibodies in colostrum that were protective against the severe challenge as applied in these trials. Commonly naïve cattle had anti-serum titres of gp40-specific antibodies of between 9 and 12 Log 2 in the antibody ELISA. Therefore, a titre of up to 10 Log 2 was considered to be the background level. After vaccination with a dose of 10 micrograms of purified gp40 that did not comprise one or more alkylated amino acids in W/O emulsion vaccine this titre increased to 12-13 Log 2 after the prime, and to 15-17 Log 2 after the booster vaccination.

From these cows colostrum could be collected that contained gp40-specific antibody titres of about 20 Log 2. Consequently, vaccine doses of 10 µg of rgp40His that was not aziridine-incubated and purified were used in prime and boost experiments. When applied in combination with Rotavec Corona vaccine, no effect was measured on the efficacy of the vaccination against rotavirus, coronavirus, or E. coli by the gp40 vaccination, see also FIG. 2. It was concluded that these vaccines could effectively be combined.

There was no difference in the feeding of colostrum once or twice a day, so once daily was applied going forward. Also feeding of colostrum for a total of 5 days was found to suffice.

3.3. Rainbow Scour Test

All animals that received challenge inoculum and had a diarrhoea score of 2 or 3, tested positive in the test for the presence of Cryptosporidium.

3.4. Side-Reactions

While the vaccinations of cattle with emulsified vaccines of rgp40His where generally safe, i.e. no systemic effects were observed, or effects on pregnancy, they did induce local reactions at the site of the vaccination: these were palpable, and upon necropsy signs of inflammation were found. This proved to be related to the presence of the gp40 protein, as a vaccine in a similar emulsion, the Rotavec Corona vaccine, did not induce such local reactions.

The only way to reduce those reactions was a reduction of the dose of gp40, however that was only possible while maintaining efficacy, when employing the Cryptosporidium gp40 protein comprising one or more alkylated amino acids of the invention.

Example 4: Effect of the Aziridine Incubation in Vaccination-Challenge Experiments 4.1. Effect on Antibody Titres In the vaccination experiment of groups of 5 pregnant cattle each, as described in Example 3 above, the cows received two doses of 10 μg rgp40His in an oil+aluminium adjuvated W/O emulsion. The gp40 was column purified, and either aziridine incubated or not. As negative control served a group receiving only the Rotavec Corona vaccine, having the same formulation. A further group received both a vaccination with gp40 that did not comprise one or more alkylated amino acids and one with Rotavec Corona vaccine. Serum antibody titres were measured weekly, and determined with the antibody ELISA. Titres at or below 10 Log 2 were set at 10, and considered background. Seroconversion profiles over time for all the gp40 vaccinates were similar. The Rotavec Corona vaccine only, induced no antibodies against gp40. The titre results for the combination vaccine show there is no interference between the two vaccine types.

While containing the same amount of gp40 antigen, the vaccine comprising Cryptosporidium gp40 protein comprising one or more alkylated amino acids induced antibody titres in cattle that were significantly higher than for the non-alkylated gp40 vaccine: 3 to 4 Log 2 higher after prime vaccination, and 2 Log 2 higher after the booster; this is represented in FIG. 2. The resulting colostrum titres of alkylated gp40 vaccination were found to be very high, at 24 Log 2.

4.2. Effect on Shedding

The effect on the shedding of oocysts by calves after challenge infection, as a result of passive vaccination, was modest, but significant. Typically a 10 fold reduction of the total amount of oocysts per 100 gram of faeces, between days 4 to 14 was found: from 10^9 oocysts in non-vaccinated—challenged calves, to 10^8 in vaccinated calves. However because also the faecal amounts were much reduced resulting from the shorter duration of diarrhoea found in the calves: 2 days in calves vaccinated with BEI-treated gp40, against 6 days in non-vaccinated calves. Therefore the overall reduction of oocyst shedding by vaccination was certainly relevant.

4.3. Effect on Safety

The gp40 protein in combination with a mineral oil adjuvant, turned out to be quite reactive; this was most apparent upon vaccination by subcutaneous route, and when applying a prime-boost regime. This effect was not aggravated by aziridine incubation of the gp40 protein.

A vaccine having a dose of 10 μg gp40 (alkylated or not), with mineral oil adjuvant, and given as prime and boost vaccination of adult Holstein cows by subcutaneous route, induced a swelling at the inoculation site up to 10 cm in diameter and up to 2 cm thick. Apart from looking severe however, the vaccinated cows did not show any signs of suffering from this local reaction: no fever was observed, and there was no effect on appetite or on the pregnancy.

Nevertheless it was decided that such swelling, even when asymptomatic and transient, was not desirable.

Fortunately, the invention as described herein allowed a reduction of the dose of gp40 protein to safe levels, while maintaining good immunological efficacy: upon adaptation of the amount of protein per dose to 1 μg of the alkylated gp40 protein, swelling after two doses given subcutaneous was typically below 5 cm in diameter and 1 cm high, mostly only 2 cm in diameter. This was considered to be acceptable. Importantly, this reduction in amount of protein by 10 fold did not affect the efficacy of vaccination, in that still sufficiently high titres of gp40 antibodies could be obtained in the colostrum.

4.4. Effect on Diarrhoea

From the vaccination-challenge experiment, the severity of diarrhoea was scored based on the parameters as presented in Table 1, last column. The results for the two most relevant groups of calves are presented in FIG. 3. These calves received colostrum either from mothers vaccinated with BEI-treated gp40 vaccine, or with non-treated gp40 vaccine. Challenge was given at day one, after the first bolus of colostrum, as described. The average daily score of diarrhoea per group was determined, and plotted over the course of the 14 day experiment.

As can clearly be seen from FIG. 3, the severity of diarrhoea was much lower, and much shorter for the group receiving colostrum from BEI-gp40 vaccinated cows. The difference is impressive and highly relevant: the rgp40His+BEI vaccine group only had significant diarrhoea (score above 1.0) for 2 days (on days 7 and 8). However the rgp40His vaccine group (gp40 mock treated with aziridine) had significant diarrhoea for 6 days (on days 6-11). Whereby the diarrhoea in the rgp40His+BEI vaccine group was also of much lesser severity: maximal score was 1.2, as compared to a maximum score of 2.8 in the mock-BEI-treated vaccine group.

In Conclusion:

A truly effective Cryptosporidiosis vaccine has been found, which is capable of significantly reducing both the severity and the duration of diarrhoea caused by a heavy challenge infection with Cryptosporidium parasites.

Also, the model of passive vaccination of newborn calves, by the feeding of colostrum from vaccinated mothers, was found to be highly effective.

Example 5: Ongoing Studies

5.1. Dose Finding

In ongoing dose finding studies, vaccine doses of 0.1-0.2-0.5-1-2.5 and 5 μg of the alkylated gp40 protein according to the invention are being tested.

Initial results indicate that 1 μg of the alkylated gp40 protein per dose, in a prime-boost regime, will induce sufficient level of gp40 specific antibody in a pregnant bovine. So far, a 1 μg dose, with mineral oil adjuvant, and given twice by subcutaneous route induced a titre of 19 Log 2 Elisa units, at 2 weeks after the priming vaccination, which dropped to 18 at 4 weeks p.v., when the booster vaccination was given. The booster then increased the titre again to 22 at 6 weeks p.v., which reduced slightly to a titre of 21 Log 2 at 8 weeks after the priming vaccination. At calving, colostrum antibody values were found to be 1-2 Log 2 higher than serum Ab levels.

Considering that a colostrum titre of 17-18 Log 2 will suffice to protect calves, the optimal vaccination protocol aims to reach a titre of 15-16 Log 2 in the vaccinated bovine mother. Consequently, even a vaccine dose of 0.5 μg of the alkylated gp40 protein according to the invention will suffice to reach such titre levels in the mother with a prime-boost regime.

Alternatively, it is being investigated if such protective titre level in colostrum can be achieved by giving only a single vaccination to pregnant ruminants, using 0.5 or 1 μg of alkylated gp40 protein per dose.

Example 6: Mass-Spectrometry Analysis

To determine which amino acids were alkylated by aziridine incubation, LC-MS/MS analyses were performed of BEI-incubated- and non-incubated rgp40His. The protein was digested in parallel by different enzymes, whereby the peptides detected were analysed for having an adduct of 42 Da, corresponding to an alkylation by an ethylenimine molecule.

6.1 Materials and Methods 6.1.1 Protein Samples Tested

Two batches of rgp40His were used, having a different initial concentration of the protein: batch 01K at 4.1 mg/ml, and batch 12 G at 1.0 mg/ml, by BCA. Both these batches were BEI-incubated as described. As control, a batch of rgp40His protein that was not aziridine-incubated was used; batch 2DJ, at 0.62 mg/ml, and this batch was nano-filtered to remove any residual baculovirus.

6.1.2 Intact-Mass Analyses of gp40

Protein amount was determined by BCA (Pierce) using the manufacturer's protocol. Approximately 6-8 μg of rgp40His sample was analysed by liquid-chromatography and mass-spectrometry (LC-MS) using an Agilent 1290 LC and Agilent 6545 QTOF MS. A MassPrep™ Online Desalting cartridge (Waters) was used at 0.4 ml/min flowrate at 60° C. LC buffer A consisted of 0.1% v/v formic acid in water, and buffer B of 0.1% formic acid in acetonitrile. The gradient was 5%-80% buffer B in 5 min, and was kept at 80% buffer B for 1 min. Equilibration occurred at 5% buffer B, with total run time of 8 min. The column eluent was electrosprayed into the MS using the Dual AJS ESI source (typically at 4 kV). MS scans were recorded between 100 and 3200 m/z at 1 spectra/sec.

6.1.3 Peptide Mapping of gp40

Peptide mapping of rgp40His was performed by digestion with the enzymes: trypsin, chymotrypsin or GluC (*Staphylococcus aureus* Protease V8) at an enzyme:protein ratio of 1:50, by incubation for an hour. Subsequently enzyme was added again, in the same ratio, and digestion was continued overnight. Sample clean-up was performed by Sep-Pak™ tC18, 1 cc, 50 mg sorbent cartridges (Waters). The peptide mixtures were eluted with 0.1% v/v formic acid in 90% acetonitrile. The solvent was evaporated in a Speedvac™ at room temperature. Peptide sample mixtures were reconstituted in 0.1% formic acid.

Approximately 30 μg of enzyme digest was analysed by LC-MS as described. Peptide mixtures were separated using an Agilent AdvanceBio™ Peptide Map, C18, 1.2×150 mm, 2.7-micron at 0.4 mL/min at 60° C. LC buffers A and B were as described. The gradient used was 2%-45% buffer B in 110 min followed by 45%-95% buffer B in 5 min, and kept at 95% buffer B for 10 min. Equilibration was done with 2% buffer B, with a total run time of 145 min. The column eluent was electrosprayed into the MS using the Dual AJS ESI source (typically at 4 kV). MS scans were recorded between 100 and 1700 m/z at 4 spectra/sec. MS/MS scans were recorded between 150 and 3200 m/z at 2 spectra/sec. A maximum of 5 precursor ions per cycle were selected for MS/MS at an abundance threshold of 10000 counts. Precursor ions were excluded after 5 repeats for 1 min. Isolation width was set to Medium (4 amu).

6.1.4 MS Data Analyses

Intact Analyses

LC peaks containing protein fragments were deconvoluted using MassHunter™ Qualitative Analysis B.07.00 software. The deconvolution algorithm was 'maximum entropy'; the mass range was 16,000-23,000 Daltons, m/z range 800-2000. Baseline subtraction was turned on, and the baseline factor was set to 7.00. Adduct was set to 'proton', and the isotope width to 'automatic'.

Peptide Mapping

Agilent QTOF MS/MS data files were converted to MFG files using the MassHunter software. For each data file a compounds list was created using the 'Find Compounds by Auto MS/MS' function. 'Extract MS/MS' with Extract average MS/MS spectra for all collision energies was enabled. Otherwise default settings were applied. The compounds list was exported to MGF with 'Compute deisotope' enabled, 'Isotope model' set to peptide and 'Limited assigned charge state' set to a maximum of 7. MFG files were searched against the *Cryptosporidium parvum* gp40 recombinant protein of SEQ ID NO: 3 database in Mascot™. Enzyme restriction was set to none.

Ethyleneimine (43.04 Da, $C_2H_5N$) was set as variable modification for all amino acids. MS tolerance was set to 25 ppm and MS/MS tolerance to 0.1 Da. Peptide charge was set to 2+, 3+ and 4+.

MGF files also were searched against the host cell protein database (Sf9, Spodoptera frugiperda, Uniprot 201909127, with 26,506 entries) using identical settings as described above.

6.2 Results

In the BEI-incubated gp40, about one quarter of the protein did not contain an EI-adduct, one quarter had one adduct, and the rest had two or more adducts, in rapidly declining frequency.

Intact-mass analysis revealed no evidence of glycosylation or other post-translational modifications. Also, no significant database hits were found for Sf9 host cell proteins.

A multiple digestion approach was applied to analyse protein fragments, using digestion with trypsin, chymotrypsin or GluC. Together these generated a full set of overlapping peptides, with good sequence coverage, and a highly confident assignment of El-adducts. The top 4 modification sites were given an additional manual analysis.

The PepMap results showed full sequence coverage of gp40, but limited sequence coverage of the His-tag tail. However it is very unlike that the El adducts are located at the histidines. The coverage of the various peptide fragments is presented in Table 2.

In Table 2 the 1 (*) result for total El-alkylated peptides in the native protein sample is a false positive score.

TABLE 2

Peptide mapping results

| gp40 protein batch tested | Peptide ID's | | | Total El-alkylated | Unique El-modification sites | Dominant El-modif. sites |
| --- | --- | --- | --- | --- | --- | --- |
| | Trypsin | Chymotrypsin | GluC | | | |
| 01K-BEI | 201 | 64 | 134 | 50 | 31 | 4 |
| 12G-BEI | 317 | 223 | 135 | 117 | 62 | 4 |
| 2DJ (native) | 207 | 156 | 83 | 1 * | 0 | 0 |

The PepMap analysis allowed for the site-specific identification of El-adducts. The identification of El-modification sites could be done using automated database searching, as there was prior knowledge of the adducts to be detected: each El-adduct increases size by 42 Da, but the resolution of the methods applied had an accuracy of ±1 Da, so weight-increases of 41-43 Da were analysed. Selection against multiple El-adducts on one amino acid was done by the MS-analysis software.

Figure 4:
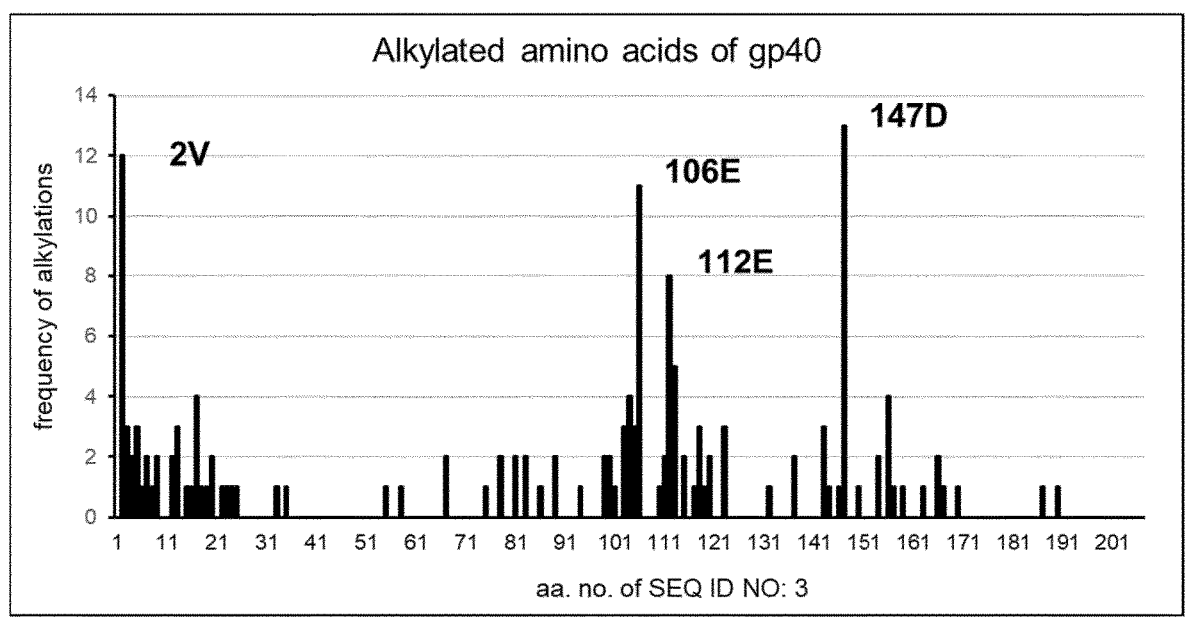

From the combined data of both aziridine-incubated batches, the gp40 amino acids: 2V, 106E, 112E, and 147D (numbered as in SEQ ID NO: 3) appeared to be the dominant sites of alkylation. Results are presented in FIG. 4. Some other amino acids were found to be alkylated as well, though to (much) lower frequency: cysteine, methionine, serine, threonine, tyrosine, lysine, and arginine. Thus, interestingly, aspartic acid (D) and glutamic acid (E) appeared to be the dominant sites of modification, with minor frequencies for other amino acids.

The Cryptosporidium gp40 protein used in these tests was the recombinant-expressed gp40-His, with the amino acid sequence of SEQ ID NO: 3. However, the dominant protein detected in all samples was rgp40His without initiating methionine, which has a basic molecular weight of 20.9 kDa. The missing N-terminal methionine, opened-up the valine at position 2 for alkylation.

Example 7: Vaccination-Challenge Trials with Low-Dose Vaccines

As indicated in Example 5 above, dose-finding experiments were done, using vaccines according to the invention with very low doses of BEI-gp40. Pregnant heifers were actively vaccinated, and calves were passively vaccinated and challenged. The setup and performance was essentially as described above. Specifically the experiments were performed as follows: first, hyper-immune colostrum was generated by vaccinating pregnant heifers and collecting their colostrum from the first and the second milking. The amounts of alkylated gp40 protein used per animal dose were: 0.4 or 1.5 µg. Vaccines were formulated as water-in-oil emulsion as described above, using oil (ISA 70)+aluminium (Alhydrogel) as adjuvants. The vaccine was administered by subcutaneous route as prime and boost, at 7 weeks and at 3 weeks before expected calving date, respectively. Serum and colostrum samples were tested for specific IgG antibody response against gp40 using ELISA, as described above.

Next, newborn calves were fed with this colostrum for 5 days, and were then challenged with *C. parvum* parasites. After challenge the scores for diarrhoea and other clinical scores were determined, and reported as health scores, according to the Wisconsin-Madison scale as described in McGuirk (supra).

7.1 Generation of Hyper-Immune Sera with Low-Dose Vaccines

Pregnant heifers (Holstein Friesian cows) were used, in two groups: group 1: 11 animals were vaccinated twice via the subcutaneous route with adjuvated BEI-rgp40his subunit vaccine with 1.5 µg gp40 per animal dose, in a 2 ml volume/dose. Vaccinations were given at approximately seven and three weeks before expected calving date. In group 2, twelve animals remained unvaccinated for the production of control colostrum. All animals also received a vaccination with Rotavac® Corona (MSD AH) vaccine according to the manufacturer's instructions.

Blood samples were taken just before each vaccination (on the same day) and 1 week after the second vaccination from each animal of group 1, and once from animals of group 2 one week before vaccination with Rotavec® Corona vaccine.

The results of the serology from the vaccinated cows are presented in Table 3, as the average anti-gp40 Elisa titre per group, with their standard deviations.

TABLE 3

Anti-gp40 IgG titres (Log2) of cow sera

| | dose of | day 0 (1st vacc.) | | 4 w p.v.1 | | 1 w p.v.2 | |
| --- | --- | --- | --- | --- | --- | --- | --- |
| Group | gp40 | Avg. | SD | Avg. | SD | Avg. | SD |
| 1 | 1.5 | 10.2 | 1.2 | 16.8 | 2.2 | 17.5 | 1.3 |
| 2 | — | 9.9 | 0.9 | — | — | — | — |

At the start of the study the average IgG antibody titres against gp40 were comparable for both groups and were at background level.

As is evident from Table 3, the results show a marked increase of serum IgG titres against gp40 in group 1 after the first and the second vaccinations. Both titres however indicated that protective levels of colostrum antibodies would be generated.

After parturition, the first two milkings were collected from each cow and stored for later use in the passive vaccination/challenge experiment. First milking was collected within 6 hours post partum, and the second milking within 20 hours p.p. On average, about 5 litres of colostrum was collected per cow per milking. Colostrum IgG Elisa results are presented in Table 4 as averages per group with their standard deviations.

TABLE 4

Anti-gp40 IgG titres (2Log) in colostrum

| Group | Milking | Avg. | SD |
|---|---|---|---|
| 1 | 1 | 21.4 | 1.6 |
|   | 2 | 20.1 | 1.2 |
| 2 | 1 | 13.8 | 1.5 |
|   | 2 | 11.6 | 1.8 |

The colostrum titres showed that protective levels of anti-gp40 colostral antibodies were produced in colostrum from the vaccinated group, and this was significantly higher than the titre in colostrum from the non-vaccinated control animals (p-value<0.001).

7.2 Passive Vaccination-Challenge Trial Using Hyper-Immune Colostrum

In a subsequent experiment, the hyperimmune colostrum generated as described in section 7.1 above, was used for passive vaccination of newborn calves. This allowed to test the protection provided by that colostrum against a challenge infection with C. parvum parasites, after colostrum feeding for 5 days. Groups of eight newborn calves were used; as the calves were born on different days, they progressed though the trial schedule from different starting dates. Calves were Holstein-Friesian, of at least 34 kg, were not older than 4 hours at the start of the experiment, and had not received any colostrum prior to the trial.

All calves received 3 litres of colostrum within 4 hours after birth and a combination of colostrum and milk replacer once a day for five consecutive days (groups 1 and 2). All calves were challenged orally with 10^4 C. parvum oocysts 2 to 4 hours after the first feed of colostrum. Faecal consistency and health scores of each calf were assessed twice daily for fourteen days.

Group division was as follows:
1. n=8, colostrum from 1.5 µg BEI-gp40 vaccinated cows, for 5 days
2. n=8, colostrum from non-vaccinated cows, for 5 days Blood samples were taken from the calves at the start of the experiment and on day three to confirm their uptake of anti gp40 antibodies.

After challenge, daily health checks were performed of each calf for 14 days, to determine health scores according to Table 1 above, including scoring of faecal consistency twice daily (morning and afternoon).

Faecal material from every animal that had a diarrhoea score of 2 or 3 at any given time point, was tested once a day for presence of C. parvum or other enteric pathogens using the commercial Rainbow Calf Scours 4™ test (BIO-K 288), until at least one test was confirmed positive for C. parvum.

The serology results showed the following serum IgG titres against gp40: at day one all titres were at base line level of 8.8 Log 2. At day three of colostrum feeding the average titres in the calf sera were: group 1: 20.6±0.4, and group 2: 10.9±0.7.

Rainbow test scores showed that all diarrhoea was due to C. parvum infection. Most calves from group 1 (colostrum from 1.5 µg BEI-gp40 vaccinated cows, for 5 days) showed C. parvum in their faeces at day 8 p.c., and most calves from group 2 (colostrum from non-vaccinated cows, for 5 days) at 6 days p.c.

Figure 5:
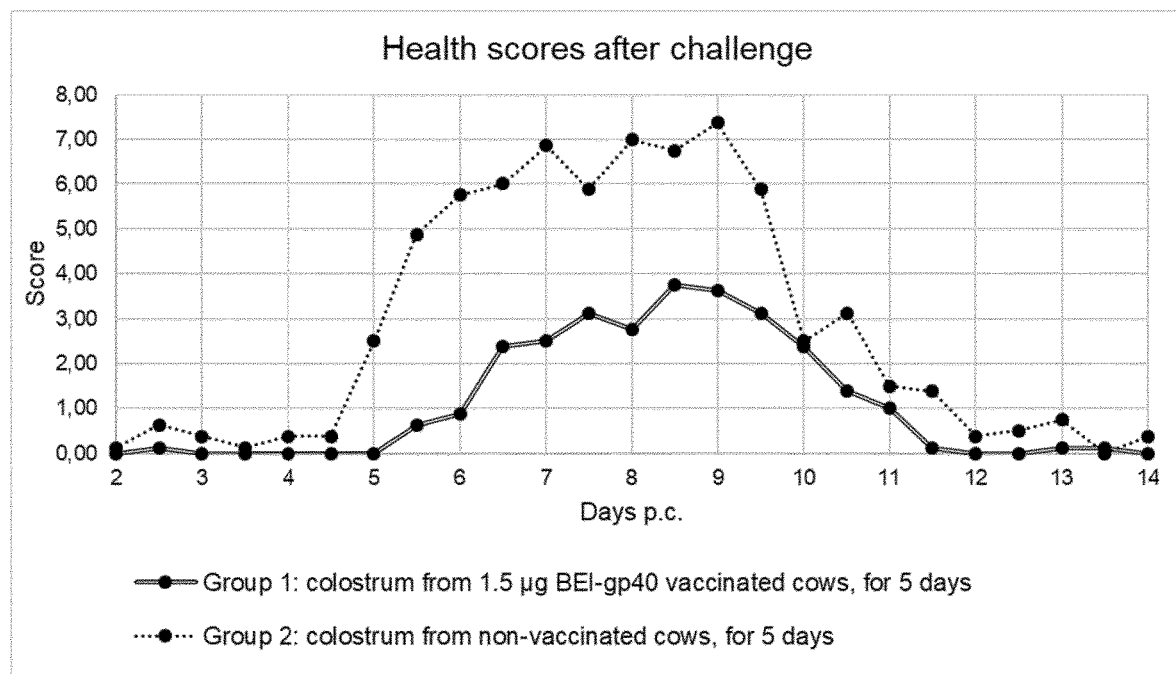

The results of the health scores are presented in FIG. 5. These scores included the faecal consistency scores, and were determined as outlined in Table 1 above, according to the Wisconsin-Madison scale (supra). As is clear, the calves receiving colostrum from gp40 vaccinated cows were much better capable of dealing with a severe challenge infection of C. parvum parasites, as they did not get nearly as sick as calves receiving colostrum without anti-gp40 antibodies.

7.3 Conclusion

The conclusion can be drawn that even doses of alkylated-gp40 protein of 1.5 µg per animal dose of vaccine, can induce levels of anti-gp40 antibodies in colostrum that can passively protect effectively against a severe C. parvum challenge infection.

Legend to the Figures

FIG. 1

Amino acid sequence of the Cryptosporidium gp40 protein for the invention, in one-letter IUPAC code, corresponding to SEQ ID NO: 1.

FIG. 2

Graphical representation of the measured titres of gp40-specific antibodies, in sera of vaccinated cattle, indicated in Log 2 Elisa units. Details are given in Examples 3 and 4.

Test groups were:
rgp40His=vaccine of Cryptosporidium gp40 protein that had not been alkylated;
rgp40His+BEI=vaccine of Cryptosporidium gp40 protein comprising one or more aziridine-alkylated amino acids according to the invention;
RC vaccine=Rotavec Corona vaccine
rgp40His+RC=dual vaccinated group, received both Rotavec Corona vaccine, and vaccine of Cryptosporidium gp40 protein that had not been alkylated.

FIG. 3

Results of a vaccination-challenge experiment in calves, regarding severity of diarrhoea.

Horizontal axis presents days after challenge infection.

Vertical axis indicates the average daily diarrhoea score, for the group receiving rgp40His vaccine, and the group receiving rgp40His+BEI vaccine.

Experimental details are described in Examples 3 and 4.

FIG. 4

Results of mass-spectrometry analysis on Cryptosporidium gp40 protein that was incubated with aziridine. The graph depicts on the horizontal axis the amino acid sequence of gp40 (as presented in SEQ ID NO: 3 herein), and on the vertical axis the number of times a specific amino acid from gp40 was found to be alkylated by the incubation with aziridine. Experimental details are described in Example 6.

FIG. 5

Results of the health scoring of the vaccination-challenge experiment using a very low dose of gp40 protein to generate hyperimmune colostrum. On the horizontal axis are days post challenge. The vertical axis presents the health score according to the Wisconsin-Madison scale. Details are described in Example 7.

The invention claimed is:

1. A Cryptosporidium gp40 protein, wherein that the gp40 protein comprise one or more amino acids alkylated by an aziridine.

2. The gp40 protein of claim 1, wherein the alkylated amino acid is alkylated with an alkyl group of Formula (2):

$$\underset{R_2''\ \ R_2'}{\overset{R_3''\ \ R_3'}{\diagdown/}}\overset{\overset{H}{\underset{|}{N}}}{\underset{|}{C}}-R_1 \quad (2)$$

wherein R1 is selected from the group consisting of: H, alkyl, alkylsulfonyl, mesyl, tosyl, nosyl, brosyl, alkenyl, alkynyl, alkylaryl, arylalkyl, and cycloalkyl, wherein each of the alkyl, alkenyl, alkynyl, alkylaryl, arylalkyl, and cycloalkyl is optionally substituted with a substituent selected from the group consisting of: carbonyl, hydroxyl, alkyl, and haloalkyl;
wherein R2' and R2" are each independently selected from H and alkyl; and
wherein R3' and R3" are each independently selected from the group consisting of H and alkyl.

3. The gp40 protein of claim 1, wherein the alkyl group of Formula (2), has one of the combinations of substituents selected from the group consisting of:
R1 is C(=O)CH3, R2' is H, R2" is H, R3' is H, and R3" is H;
R1 is H, R2' is CH2CH3, R2" is H, R3' is H, and R3" is H;
R1 is H, R2' is CH3, R2" is H, R3' is H, and R3" is H;
R1 is CH2CH2OH, R2' is H, R2" is H, R3' is H, and R3" is H; and
R1 is H, R2' is C(CH3)3, R2" is H, R3' is H, and R3" is H.

4. The gp40 protein of claim 1, wherein the alkylated amino acid is one or more selected from the group consisting of: cysteine, methionine, serine, threonine, tyrosine, lysine, arginine, valine, glutamic acid, and aspartic acid.

5. The gp40 protein of claim 4, wherein the alkylated amino acid is one or more selected from the group consisting of:
valine, glutamic acid, and aspartic acid.

6. The Cryptosporidium gp40 protein of claim 1, wherein one or more or all of the features are applied, selected from the group consisting of:
the aziridine is ethylenimine or is binary ethylenimine,
the Cryptosporidium gp40 is from *Cryptosporidium parvum*,
the composition comprising the Cryptosporidium gp40 protein is the supernatant or filtrate from a baculovirus-insect cell expression system culture, and
said supernatant or filtrate is purified by column chromatography.

7. A vaccine for a human-or non-human animal target against Cryptosporidiosis, said vaccine comprising the Cryptosporidium gp40 protein of claim 1, and a pharmaceutically acceptable carrier.

8. The vaccine of claim 7, wherein the vaccine further comprises an adjuvant.

* * * * *

SEQUENCE LISTING

<160> NUMBER OF SEQ ID NOS: 3

<210> SEQ ID NO 1

```
<211> LENGTH: 183
<212> TYPE: PRT
<213> ORGANISM: Cryptosporidium parvum

<400> SEQUENCE: 1

Asp Val Pro Val Glu Gly Ser Ser Ser Ser Ser Ser Ser Ser Ser Ser
1               5                   10                  15

Ser Ser Ser Ser Ser Ser Ser Thr Ser Thr Val Ala Pro Ala Asn Lys
                20                  25                  30

Ala Arg Thr Gly Glu Asp Ala Glu Gly Ser Gln Asp Ser Ser Gly Thr
            35                  40                  45

Glu Ala Ser Gly Ser Gln Gly Ser Glu Glu Gly Ser Glu Asp Asp
50                  55                  60

Gly Gln Thr Ser Ala Ala Ser Gln Pro Thr Thr Pro Ala Gln Ser Glu
65                  70                  75                  80

Gly Ala Thr Thr Glu Thr Ile Glu Ala Thr Pro Lys Glu Cys Gly
                85                  90                  95

Thr Ser Phe Val Met Trp Phe Gly Glu Gly Thr Pro Ala Ala Thr Leu
                100                 105                 110

Lys Cys Gly Ala Tyr Thr Ile Val Tyr Ala Pro Ile Lys Asp Gln Thr
            115                 120                 125

Asp Pro Ala Pro Arg Tyr Ile Ser Gly Glu Val Thr Ser Val Thr Phe
130                 135                 140

Glu Lys Ser Asp Asn Thr Val Lys Ile Lys Val Asn Gly Gln Asp Phe
145                 150                 155                 160

Ser Thr Leu Ser Ala Asn Ser Ser Pro Thr Glu Asn Gly Gly Ser
                165                 170                 175

Ala Gly Gln Ala Ser Ser Arg
            180

<210> SEQ ID NO 2
<211> LENGTH: 621
<212> TYPE: DNA
<213> ORGANISM: Artificial Sequence
<220> FEATURE:
<223> OTHER INFORMATION: Codon optimised C. parvum gp40 gene with 3' His
      tag
<220> FEATURE:
<221> NAME/KEY: CDS
<222> LOCATION: (1)..(621)

<400> SEQUENCE: 2 atg gtg tct gct gtg ttc agc gct ccg gca gtc ccc cta cgc gga acc     48
Met Val Ser Ala Val Phe Ser Ala Pro Ala Val Pro Leu Arg Gly Thr
1               5                   10                  15 ctc aag gat gtt cct gtc gaa ggt tca tct tcc tca tcg tca tcc tct     96
Leu Lys Asp Val Pro Val Glu Gly Ser Ser Ser Ser Ser Ser Ser Ser
                20                  25                  30 tcc tct tcg agc tca tct agc agc tca act agc acc gtt gca ccc gcc    144
Ser Ser Ser Ser Ser Ser Ser Ser Thr Ser Thr Val Ala Pro Ala
            35                  40                  45 aac aaa gca cgt acc gga gaa gac gca gag ggt agc caa gac tca agc    192
Asn Lys Ala Arg Thr Gly Glu Asp Ala Glu Gly Ser Gln Asp Ser Ser
50                  55                  60 ggc acg gaa gca tct ggt tca caa gga tct gag gaa gag ggt agc gag    240
Gly Thr Glu Ala Ser Gly Ser Gln Gly Ser Glu Glu Glu Gly Ser Glu
65                  70                  75                  80 gat gac ggt caa acc tct gca gcc tcc cag ccc act acc ccc gca caa    288
Asp Asp Gly Gln Thr Ser Ala Ala Ser Gln Pro Thr Thr Pro Ala Gln
                85                  90                  95
```

```
tca gag ggc gca act acc gag acg att gaa gcc acc ccc aag gag gaa    336
Ser Glu Gly Ala Thr Thr Glu Thr Ile Glu Ala Thr Pro Lys Glu Glu
            100                 105                 110 tgt gga acc agc ttc gtc atg tgg ttc ggt gaa gga act ccc gcg gca    384
Cys Gly Thr Ser Phe Val Met Trp Phe Gly Glu Gly Thr Pro Ala Ala
        115                 120                 125 acc tta aaa tgc ggc gca tac acc atc gtg tac gct ccc atc aag gac    432
Thr Leu Lys Cys Gly Ala Tyr Thr Ile Val Tyr Ala Pro Ile Lys Asp
130                 135                 140 cag acc gat ccc gct ccc cgt tac att tcc ggc gaa gtt acc tct gtg    480
Gln Thr Asp Pro Ala Pro Arg Tyr Ile Ser Gly Glu Val Thr Ser Val
145                 150                 155                 160 acc ttc gag aaa tca gac aac acc gtg aag att aag gtg aac ggt caa    528
Thr Phe Glu Lys Ser Asp Asn Thr Val Lys Ile Lys Val Asn Gly Gln
                165                 170                 175 gat ttc agc acc ctt agc gca aat tca tcg tct ccg acc gaa aat ggt    576
Asp Phe Ser Thr Leu Ser Ala Asn Ser Ser Pro Thr Glu Asn Gly
            180                 185                 190 gga agc gca ggt caa gct tct tca agg cac cat cac cat cat cac        621
Gly Ser Ala Gly Gln Ala Ser Ser Arg His His His His His His
        195                 200                 205

<210> SEQ ID NO 3
<211> LENGTH: 207
<212> TYPE: PRT
<213> ORGANISM: Artificial Sequence
<220> FEATURE:
<223> OTHER INFORMATION: Synthetic Construct

<400> SEQUENCE: 3

Met Val Ser Ala Val Phe Ser Ala Pro Ala Val Pro Leu Arg Gly Thr
1               5                   10                  15

Leu Lys Asp Val Pro Val Glu Gly Ser Ser Ser Ser Ser Ser Ser Ser
            20                  25                  30

Ser Ser Ser Ser Ser Ser Ser Ser Thr Ser Thr Val Ala Pro Ala
        35                  40                  45

Asn Lys Ala Arg Thr Gly Glu Asp Ala Glu Gly Ser Gln Asp Ser Ser
50                  55                  60

Gly Thr Glu Ala Ser Gly Ser Gln Gly Ser Glu Glu Glu Gly Ser Glu
65                  70                  75                  80

Asp Asp Gly Gln Thr Ser Ala Ala Ser Gln Pro Thr Thr Pro Ala Gln
                85                  90                  95

Ser Glu Gly Ala Thr Thr Glu Thr Ile Glu Ala Thr Pro Lys Glu Glu
            100                 105                 110

Cys Gly Thr Ser Phe Val Met Trp Phe Gly Glu Gly Thr Pro Ala Ala
        115                 120                 125

Thr Leu Lys Cys Gly Ala Tyr Thr Ile Val Tyr Ala Pro Ile Lys Asp
130                 135                 140

Gln Thr Asp Pro Ala Pro Arg Tyr Ile Ser Gly Glu Val Thr Ser Val
145                 150                 155                 160

Thr Phe Glu Lys Ser Asp Asn Thr Val Lys Ile Lys Val Asn Gly Gln
                165                 170                 175

Asp Phe Ser Thr Leu Ser Ala Asn Ser Ser Pro Thr Glu Asn Gly
            180                 185                 190

Gly Ser Ala Gly Gln Ala Ser Ser Arg His His His His His His
        195                 200                 205
```